United States Patent [19]

Heenan

[11] 3,873,184

[45] Mar. 25, 1975

[54] REFLECTOR WITH INTERSPERSED ANGLED REFLEX ELEMENTS

[75] Inventor: Sidney A. Heenan, Park Ridge, Ill.

[73] Assignee: Amerace Esna Corporation, New York, N.Y.

[22] Filed: Feb. 16, 1973

[21] Appl. No.: 333,352

[52] U.S. Cl. .................................. 350/103, 350/109
[51] Int. Cl. .............................................. G02b 5/12
[58] Field of Search ........................... 350/97–109; 404/9–16

[56] References Cited
UNITED STATES PATENTS

| | | | |
|---|---|---|---|
| 2,723,595 | 11/1955 | Rupert | 350/103 |
| 3,450,459 | 6/1969 | Haggerty | 350/109 |
| 3,469,898 | 9/1969 | Altman | 350/103 |
| 3,541,606 | 11/1970 | Heenan et al. | 350/103 |
| 3,744,117 | 7/1973 | Heenan | 350/103 |

FOREIGN PATENTS OR APPLICATIONS

| | | | |
|---|---|---|---|
| 437,651 | 11/1935 | United Kingdom | 350/109 |
| 748,391 | 12/1932 | France | 350/109 |

*Primary Examiner*—Alfred E. Smith
*Assistant Examiner*—Michael J. Tokar
*Attorney, Agent, or Firm*—Prangley, Dithman, Vogel, Sandler & Stotland

[57] ABSTRACT

The reflector is constructed of transparent material and has on its rear face a plurality of first and second retrodirective reflector elements. The optical axes of the first reflector elements are arranged at a different angle than the optical axes of the second reflector elements. The first and second reflector elements are interspersed with each other so that the reflector appears substantially fully illuminated throughout its area to a viewer who is located within a zone defined by the optical axes.

23 Claims, 41 Drawing Figures

PATENTED MAR 25 1975                     3,873,184

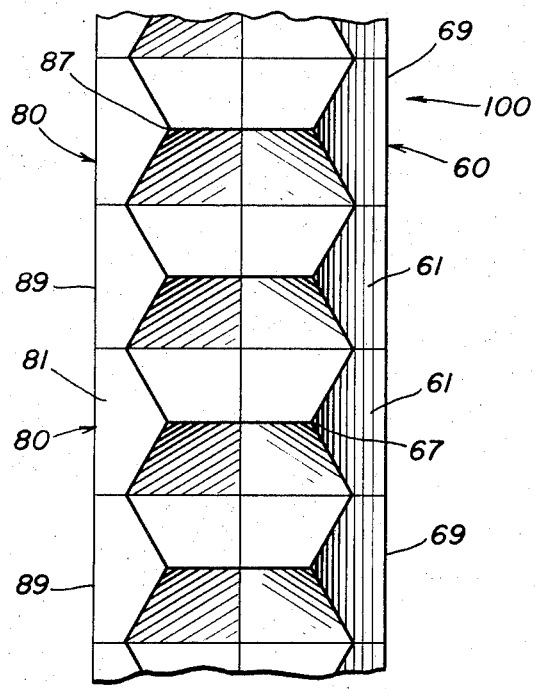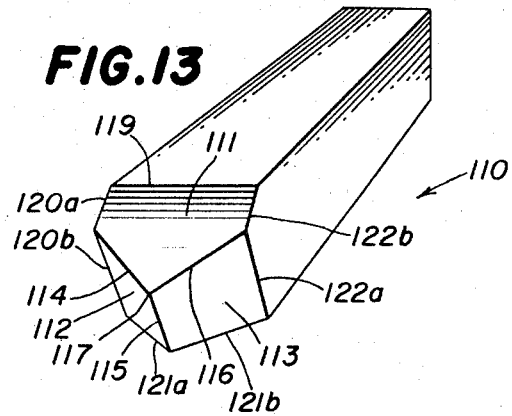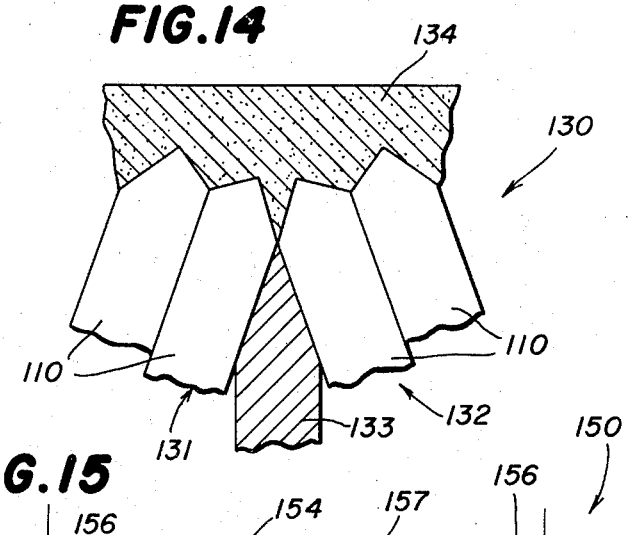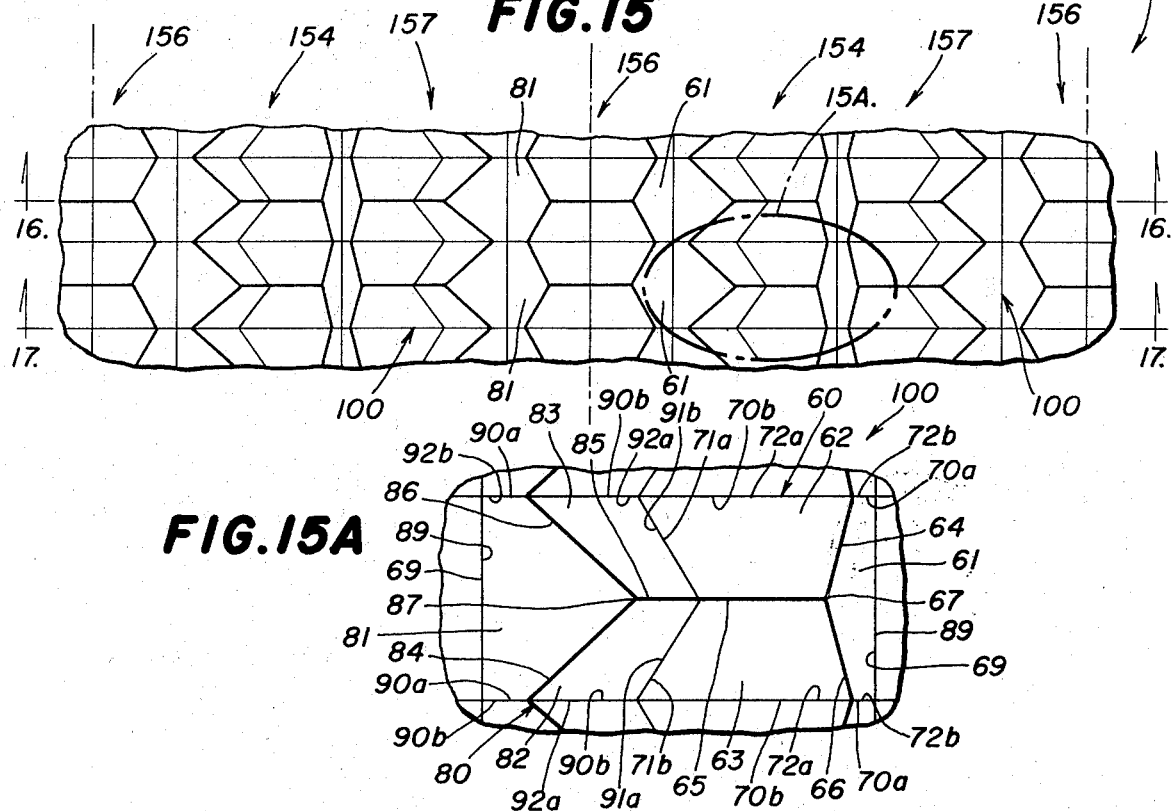

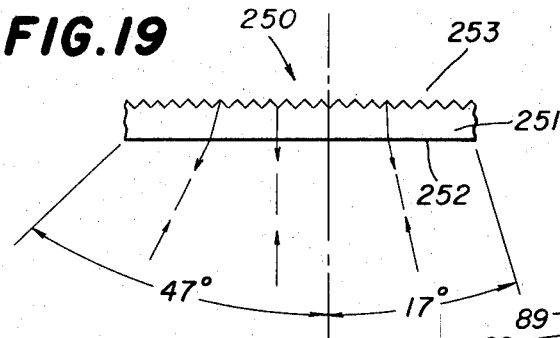
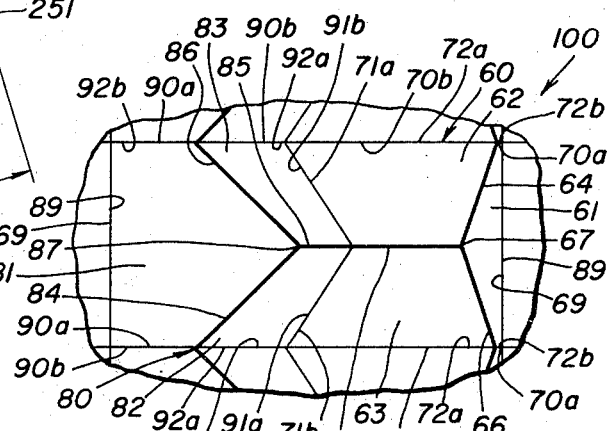
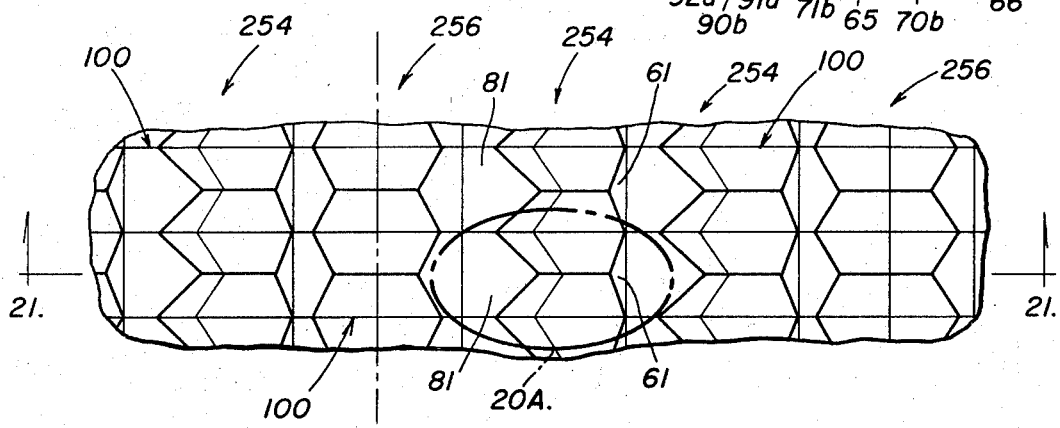
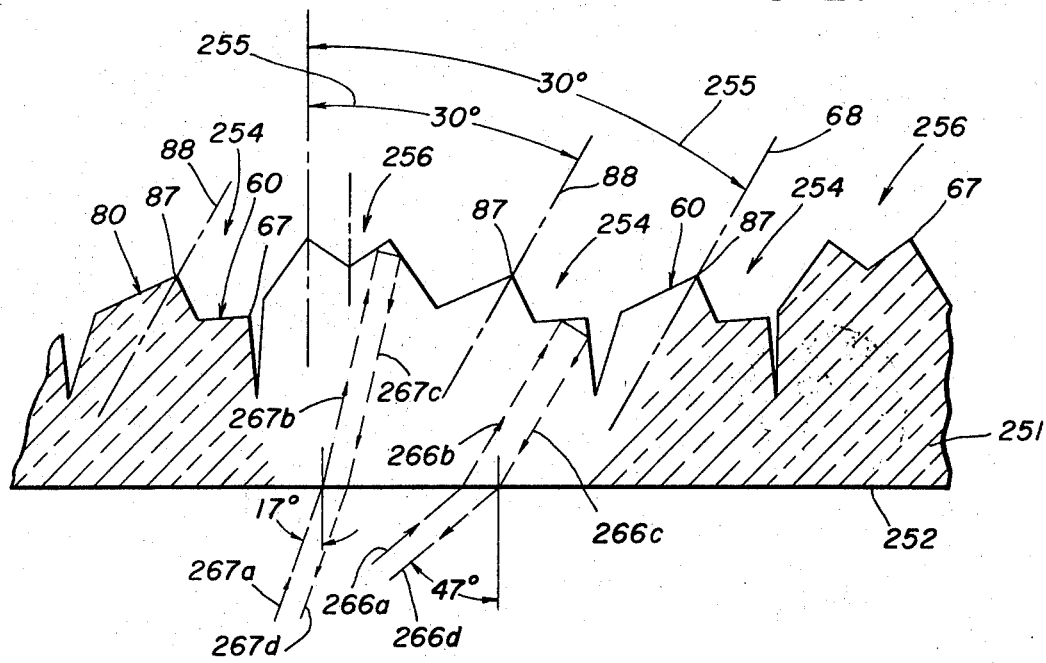

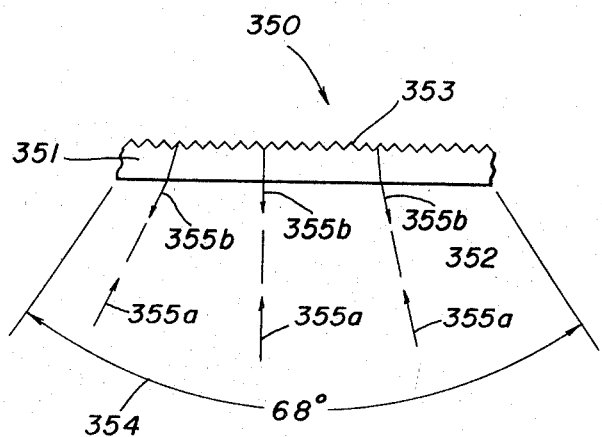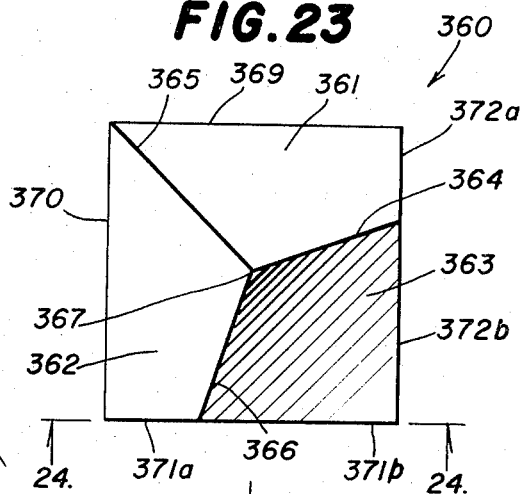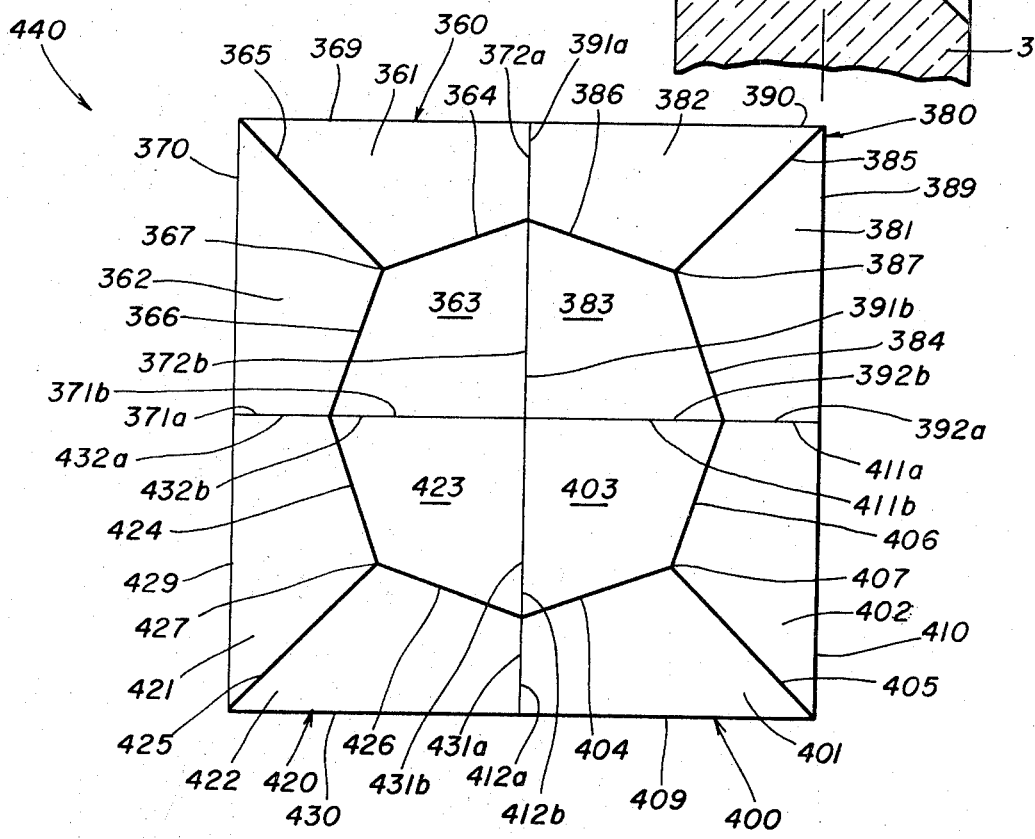

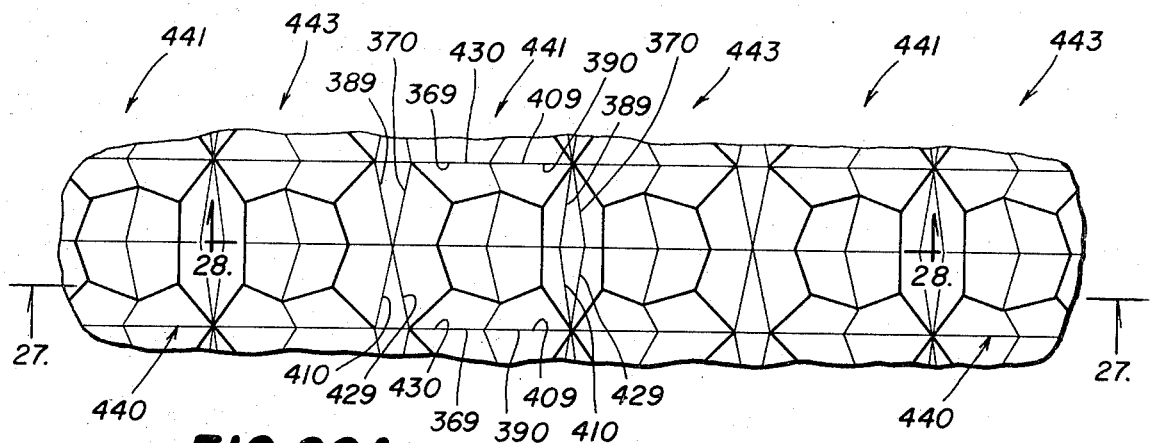
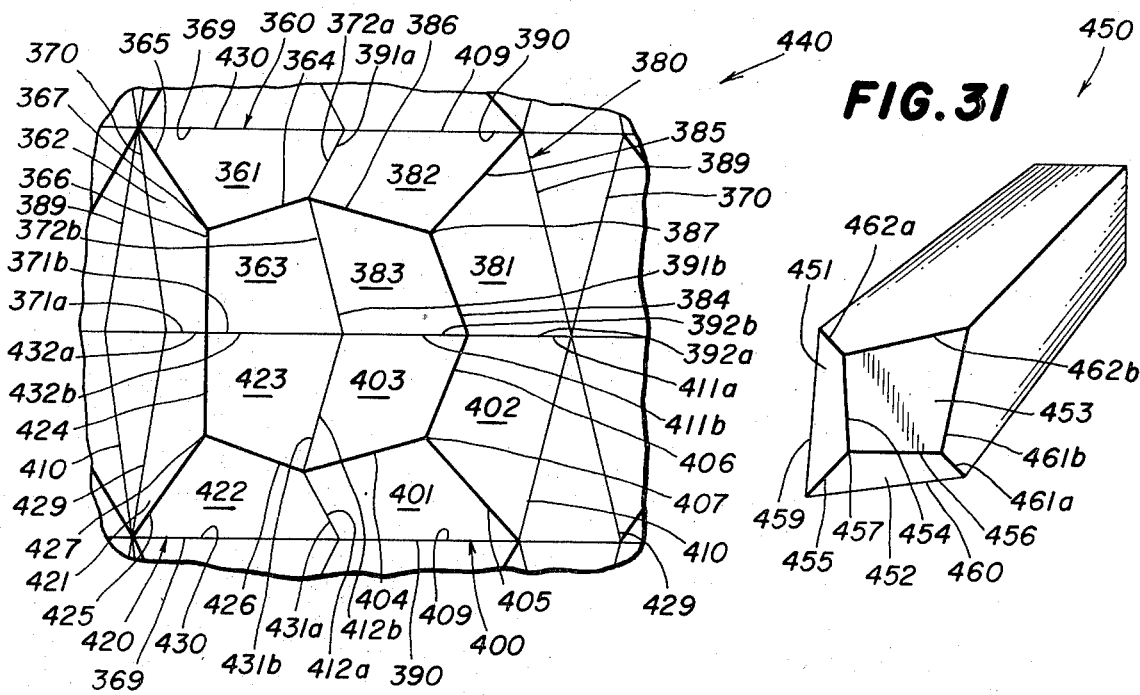
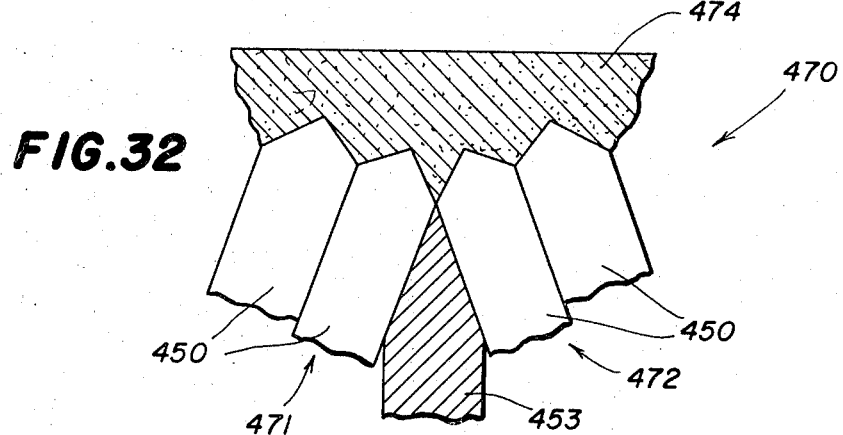

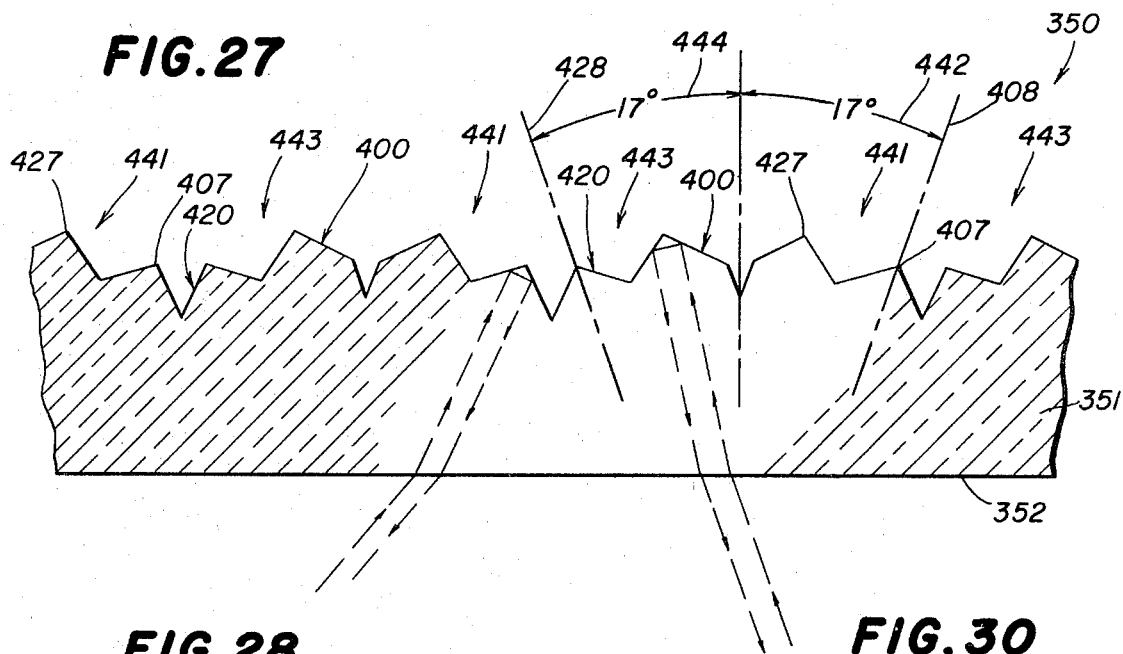
FIG.27
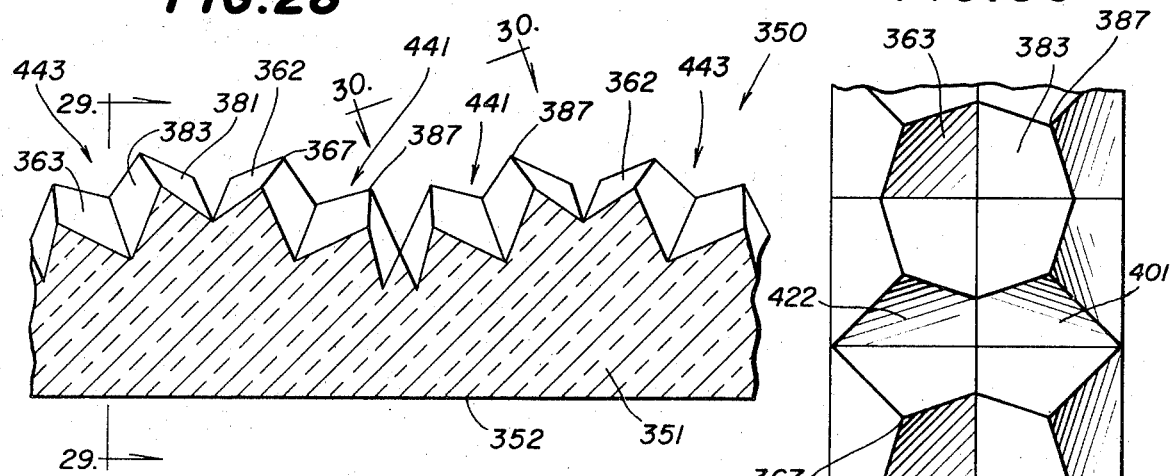
FIG.28
FIG.29
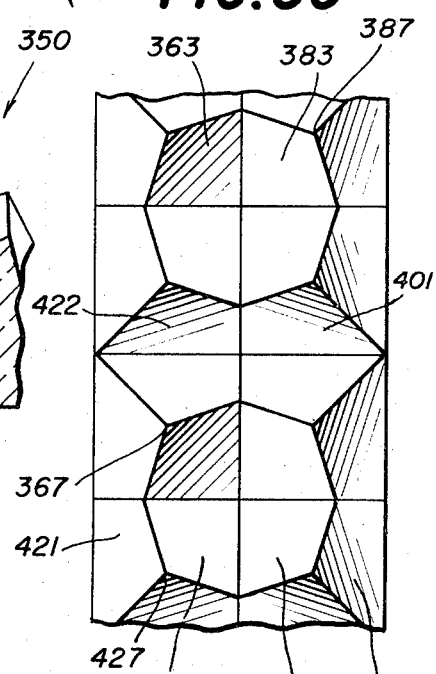
FIG.30

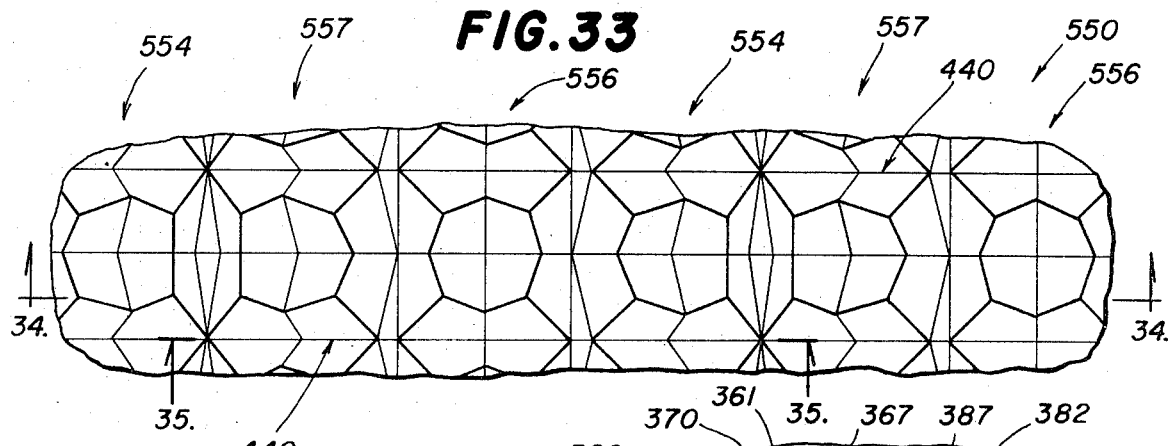
FIG. 33
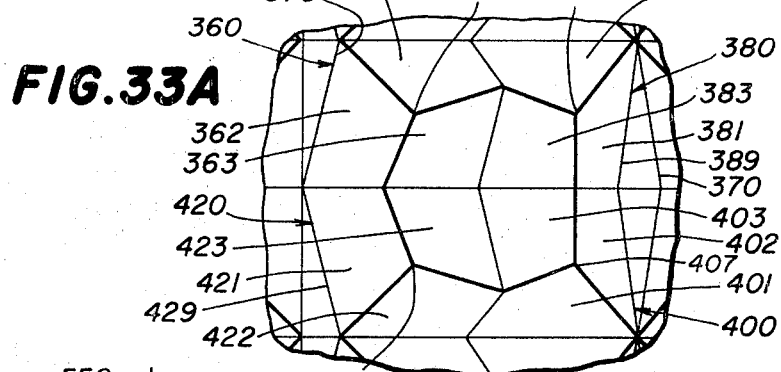
FIG. 33A
FIG. 34
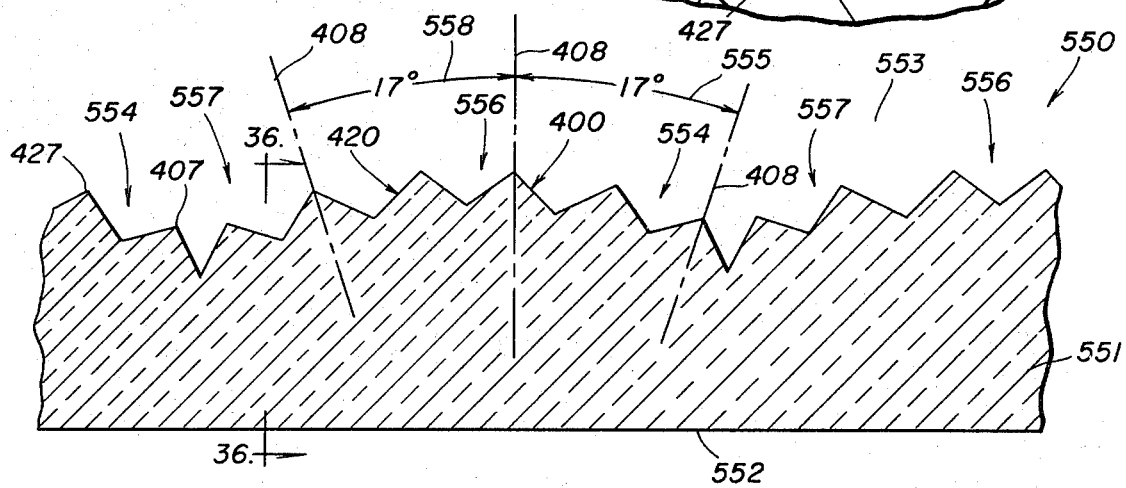
FIG. 35
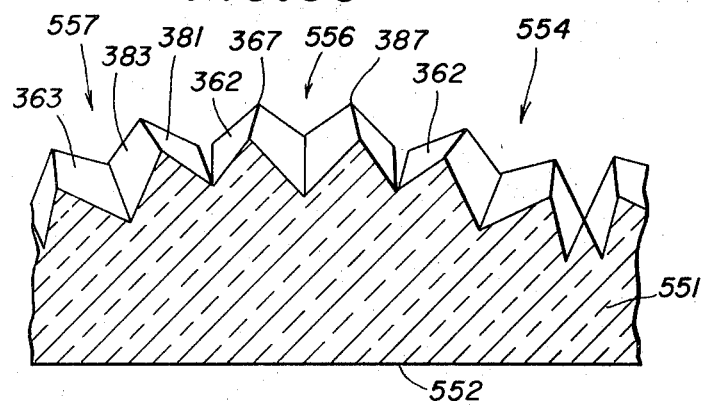
FIG. 36
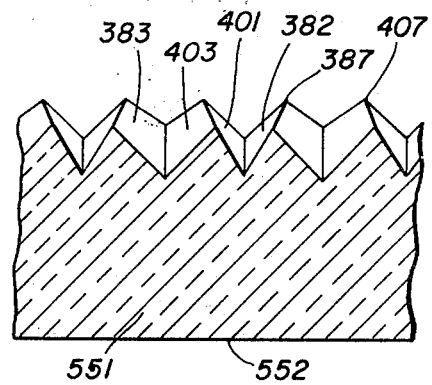

REFLECTOR WITH INTERSPERSED ANGLED REFLEX ELEMENTS

BACKGROUND OF THE INVENTION

U.S. Pat. No. 3,541,606 issued to S. A. Heenan and R. I. Nagel discloses a reflector in which the reflector elements thereof are arranged in two or more groups, the elements of one group having optical axes thereof inclined at one angle and the elements in the other group being inclined at another angle. Because of the dual angle configuration, the reflector is visible over a greater zone than would be a reflector in which all elements are similarly directed. If the viewer were located near one end of the zone of visibility of such a reflector, only the portion thereof with appropriately-angled elements would be visible while the remaining portion of the reflector would be darkened. On the other hand, such remaining portion would be visible to a viewer at the other end of the zone, and the first-mentioned portion would be dark.

While there has been a previous attempt at producing a reflector with interspersed angled reflex elements, such attempt has not been entirely satisfactory. A reflector made by Seima is composed of rows of cube corner elements which are diamond-shaped in outline. The elements in every other row are angled in one direction, and the reflector elements in the rest of the rows are angled in the other direction. However, because the boundaries between rows are not rectilinear, the reflector is inefficient. Losses are introduced by virtue of "shadowing" or "slippage" resulting from such nonrectilinear boundaries. Also, substantial variations in specific intensity result for different orientations of such a reflector.

SUMMARY OF THE INVENTION

It is, therefore, a primary object of the instant invention to provide a reflector not only visible over a wide angle, but also one which appears substantially fully illuminated throughout such angle.

Another object is to provide a reflector having first and second reflector elements of different inclination and interspersed with each other so that the reflector appears uniformly lit when viewed at any point within a predetermined zone.

Still another object is to provide a reflector having angled reflector elements so arranged as not to introduce inefficiency in respect to incoming light not parallel to the optical axes of the reflector elements.

Yet another object is to provide a reflector having interspersed angled reflex elements, in which reflector "shadowing" and "slippage" losses are virtually eliminated.

A further object is to provide a reflector having interspersed angled reflex elements, in which reflector variations in specific intensity at different orientations is reduced.

A still further object is to provide a reflector with interspersed angled reflex elements, which reflector has a wide angle characteristic, but with minimum variations in specific intensity at different entrance angles.

In summary, there is provided a retrodirective reflector for reflecting light substantially back to the source thereof over a wide angle as measured in a predetermined plane, the reflector comprising a body of transparent material having a light-receiving front face, a plurality of retrodirective first reflector elements at the rear of the body, the first reflector elements respectively having substantially-parallel first optical axes disposed at a first angle measured in the predetermined plane, the first reflector elements being capable of reflecting light back toward the source thereof within a first zone of reflectorization defined by the first optical axes, and a plurality of retrodirective second reflector elements at the rear of the body, the second reflector elements respectively having substantially-parallel second optical axes disposed at a second angle in the predetermined plane, the second reflector elements being capable of reflecting light back toward the source thereof within a second zone of reflectorization defined by the second optical axes, the first and second reflector elements being interspersed with each other to enable the reflector to appear substantially fully illuminated throughout its area to a viewer who is within a combined zone of reflectorization defined by the first and second zones of reflectorization.

BRIEF DESCRIPTION OF THE DRAWINGS

The invention, both as to its organization and method of operation, together with further objects and advantages thereof, will best be understood by reference to the following specification taken in connection with the accompanying drawings, in which:

FIG. 12 is a fragmentary view, on an enlarged scale, taken along the line 12—12 of FIG. 10;

FIG. 13 is a perspective view of a single pin which is used in the manufacture of the reflector of FIGS. 1 to 12;

FIG. 14 is a schematic view of four pins arranged to make a mold for making the reflector of FIGS. 1 to 12;

FIG. 15 is a greatly-enlarged, fragmentary view of the rear surface of a reflector incorporating a second embodiment of the present invention;

FIG. 15A is an enlarged view of one of the units, within the ellipse in FIG. 15 labeled 15A;

FIG. 19 is a fragmentary, top plan view of a reflector incorporating a third embodiment of the present invention;

FIG. 20 is a greatly-enlarged, fragmentary view of a portion of the rear surface of the reflector of FIG. 19;

FIG. 20A is a greatly-enlarged view of a single unit, shown in the ellipse labeled 20A of FIG. 20;

FIG. 21 is a view in section taken along the line 21—21 of FIG. 20;

FIG. 22 is a fragmentary, top plan view of a fourth embodiment of the present invention;

FIG. 23 is a greatly-enlarged view of a single reflector element used in the reflector of FIG. 22, when viewed along the optical axis of such element;

FIG. 24 is an elevational view of the reflector element of FIG. 23 taken along the line 24—24 thereof;

FIG. 25 is a view of a single unit of the reflector of FIG. 22, which unit is made up of four of the reflector elements of FIG. 23;

FIG. 26 is a fragmentary, elevational view of the rear surface of the reflector of FIG. 22 on a greatly-enlarged scale;

FIG. 26A is a view of one of the units depicted in FIG. 26;

FIG. 27 is a view in section taken along the line 27—27 of FIG. 26;

FIG. 28 is a view in section taken along the line 28—28 of FIG. 26;

FIG. 29 is a view taken along the line 29—29 of FIG. 28;

FIG. 30 is a fragmentary view, on an enlarged scale, taken along the line 30—30 of FIG. 28;

FIG. 31 is a view of a second type of pin which is used in the manufacture of the reflector shown in FIGS. 22 to 30;

FIG. 32 illustrates the manner in which four such pins may be utilized to make a mold for use in manufacturing the reflector of FIGS. 22 to 30;

FIG. 33 is an elevational view of the rear surface of a reflector incorporating a fifth embodiment of the present invention;

FIG. 33A is a view, on an enlarged scale, of a single unit in FIG. 33;

FIG. 34 is a view in section taken along the line 34—34 of FIG. 33;

FIG. 35 is a view in section taken along the line 35—35 of FIG. 33; and

FIG. 36 is a view taken along the line 36—36 of FIG. 34.

DESCRIPTION OF THE PREFERRED EMBODIMENTS

Figure 1:
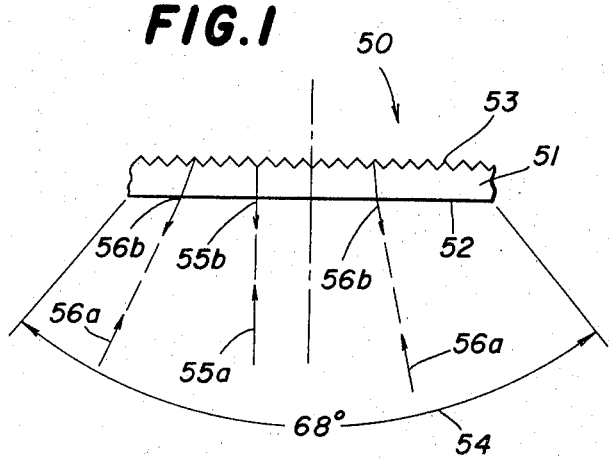
FIG. 1 is a schematic, fragmentary, top plan view of a reflector incorporating the features of the present invention.
Figure 2:
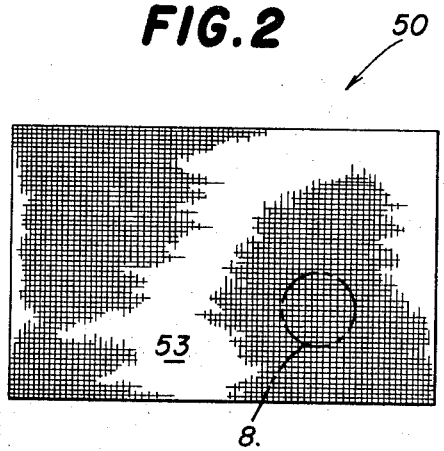
FIG. 2 is a rear elevational view, on a smaller scale, of the reflector of FIG. 1.

Turning now to the drawings, and more particularly FIGS. 1 and 2 thereof, there is shown a reflector 50 incorporating therein the features of the present invention. The reflector 50 comprises a body 51 of transparent material formed of a synthetic organic plastic resin, the preferred resin being methyl methacrylate. The body 51 has a smooth front face 52 which is also flat in the embodiment shown. The body 51 is also provided with a configured rear 53 schematically shown in FIG. 2. The reflector 50 is so designed that it will be visible to a viewer who is within a combined zone of reflectorization 54, which is 68° in this particular embodiment.

The "zone of reflectorization" is measured in a predetermined plane and means a zone throughout which the reflector will reflect at least a predetermined quantity of light to a viewer in response to a predetermined quantity of incident light from a light source, both the source of light and the viewer being within such zone. Thus, if a source of light and a viewer are both within the zone of reflectorization 54, the reflector 50 will return light rays from the source back to the viewer to cause the reflector 50 to be visible. If the light source and the viewer are without the zone of reflectorization 54, the reflector 50 will appear dark or not visible. The term "visible" means at least a predetermined quantity of light is reflected to the viewer. If the reflector is used on an automobile, for example, the reflector is designed so that it has the desired wide angle response in a "predetermined plane" which is horizontal. Although such plane will usually be perpendicular to the front face of the reflector, that need not be the case.

The manner in which the reflector 50 operates is schematically shown in FIG. 1. There is shown an incoming ray 55a which is derived from a source of light within the zone of reflectorization 54. Specifically, such ray 55a is at an angle of 0°, that is, it is directed substantially perpendicular to the front face 52 of the reflector 50. The incoming ray 55a is assumed to lie in the predetermined plane, and because it strikes the front face 52 substantially normal thereto, it is not refracted. It strikes the configured rear 53 which reflects the light to provide an outgoing ray 55b parallel to the incoming ray 55a. Although the rays 55a and 55b are shown to be aligned, it is to be understood that the properties of the reflector elements themselves cause a slight divergence between the rays 55a and 55b. Thus, the ray 55a will be returned retrodirectively by way of a ray of light 55b to an observer located substantially at the light source. Rays 56a are also in the predetermined plane, but are directed at an angle with respect to the flat front face 52 of the reflector 50. Thus, the rays 56a are refracted by such front face 52, are retrodirectively reflected by the configured rear 53, again refracted by the front face 52 and emerge as outgoing rays 56b. The configured rear 53 is designed to cause the outgoing rays 56b to be returned substantially to the observer who is located at the source of light. Thus, as long as the source of light and the observer are within the zone of reflectorization 54, the outgoing rays 56b will be returned back to the observer, to cause the reflector to be visible.

Figure 3:
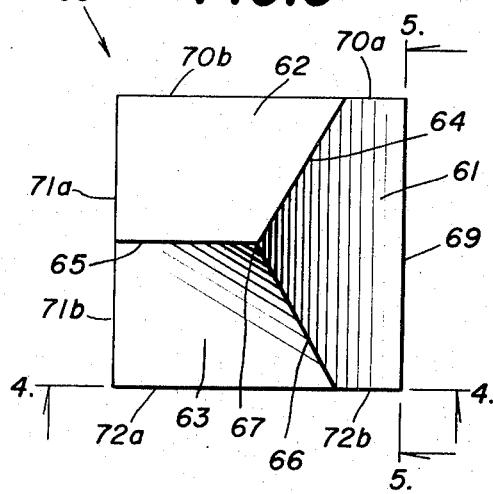
FIG. 3 is a greatly enlarged view of a square reflector element used in the reflector of FIGS. 1 and 2, perpendicular to the cube axis of such element.
Figure 5:
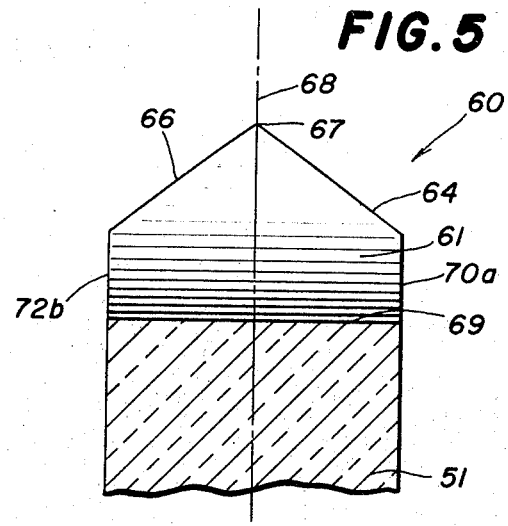
FIG. 5 is an elevational view of the reflector element of FIG. 3 taken along the line 5—5 thereof.
Figure 4:
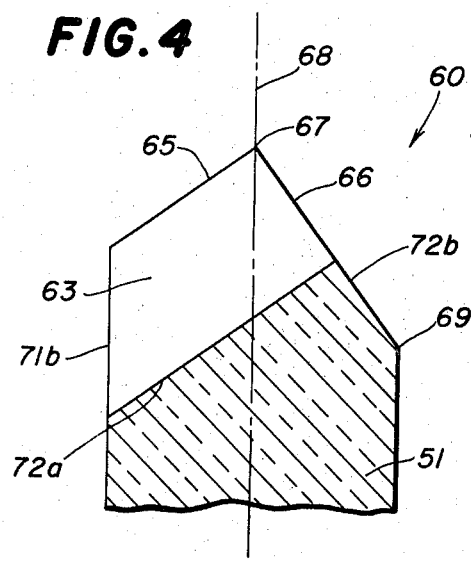
FIG. 4 is an elevational view taken along the line 4—4 of FIG. 3.

Reference is now made to FIGS. 3, 4 and 5, which illustrate the details of each of the reflector elements that make up the configured rear 53 of the reflector 50. The reflector element is designated by the number 60 and includes three faces 61, 62 and 63 which intersect along edges 64, 65 and 66. The faces 61, 62, and 63 are inclined away from a common peak or apex 67. Each of the faces is substantially perpendicular to the other faces, that is, the face 61 is perpendicular to the faces 62 and 63; the face 63 is perpendicular to the faces 61 and 62, etc. The optical or cube axis 68 is an imaginary line which passes through the apex 67 and with respect to which axis each of the faces 61, 62, and 63 is symmetrically arranged. In other words, the same angle is formed between the cube axis 68 and each of the faces 61, 62, and 63. Similarly, the cube axis 68 is symmetrically arranged with respect to the edges 64, 65 and 66, the angle between each of the edges and the cube axis 68 being the same.

Although the reflector element 60 is referred to as being of the "cube corner" type and the optical axis is referred to as a "cube" axis, it is to be understood that the term "cube" has reference to the fact that the three faces of the element are substantially perpendicular to each other, as are the three edges. The term does not suggest that the faces are congruent or equal in area. For example, one face can be substantially larger than the other two faces.

Each reflector element 60 is rectangular in outline when viewed perpendicular to the cube axis 68. In the specific form shown, the outline is square. Each reflector element 60 has one side 69 of the square boundary which is rectilinear and is contained by the face 61. Also, there is a plane normal to the cube axis 68 that contains the side 69, and therefore the side 69 is sometimes hereafter characterized as being "right angle, rectilinear". It should be noted that none of the other three sides of the square outline of the reflector element 60 is rectilinear. Specifically, the end of the edge 64 divides the upper (as viewed in FIG. 3) side into a shorter side portion 70a and a longer side portion 70b. The edge 65 intersects the left (as viewed in FIG. 3) side at the center thereof to provide equal side portions 71a and 71b. Finally, the edge 66 intersects the lower (as viewed in FIG. 3) side to provide a longer side portion 72a and a shorter side portion 72b, the shorter side portion 72b being equal in length to the side portion 70a and the side portion 72a being equal in length to the side portion 70b. The faces 62 and 63 are mirror images of each other, but each has a different shape and area than the face 61. The faces 62 and 63 are symmetrical and symmetrically disposed on opposite sides of their intersection or edge 65, while the face 61 is symmetrical with respect to an extension of the edge 65.

Figure 6:
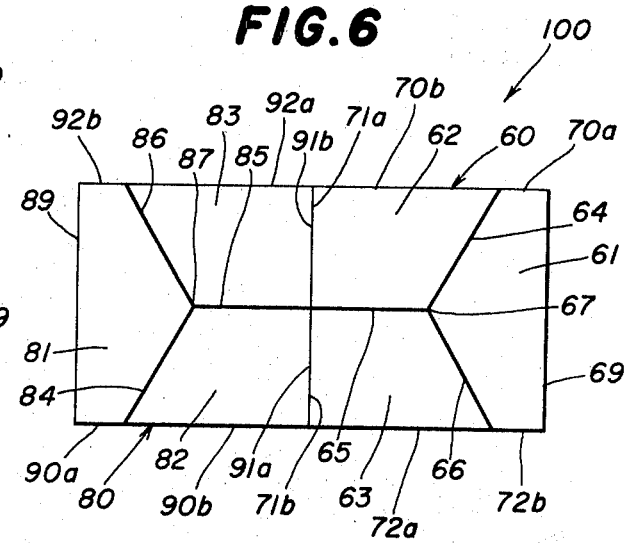
FIG. 6 is a top plan view of one of the units of the reflector of FIGS. 1 and 2, each unit being comprised of two reflector elements.

Referring to FIG. 6, there is provided a second reflector element 80, which is identical to the reflector element 60 and has the parts thereof identified by corresponding reference numerals with 20 added thereto. The reflector elements 60 and 80 are arranged into a rectangular unit 100 in which the length is twice as great as the width. The reflector elements 60 and 80 in the unit 100 are contiguous and oriented 180° with respect to each other. That is, the side portion 71a of the element 60 is common to the side portion 91b of the element 80; and the side portion 71b of the element 60 is common with the side portion 91a of the element 80. The faces 61 and 81 are in intersecting planes, with the side 69 of the element 60 and the side 89 of the element 80 being disposed parallel. It is to be understood that FIGS. 3 and 6 represent the appearance of reflector elements 60 and 80 and a unit 100 respectively, when viewed perpendicular to the cube axes 68 and 88. When viewed at an angle with respect to the cube axes, the appearance of the elements 60 or 80 is different.

Figure 7:
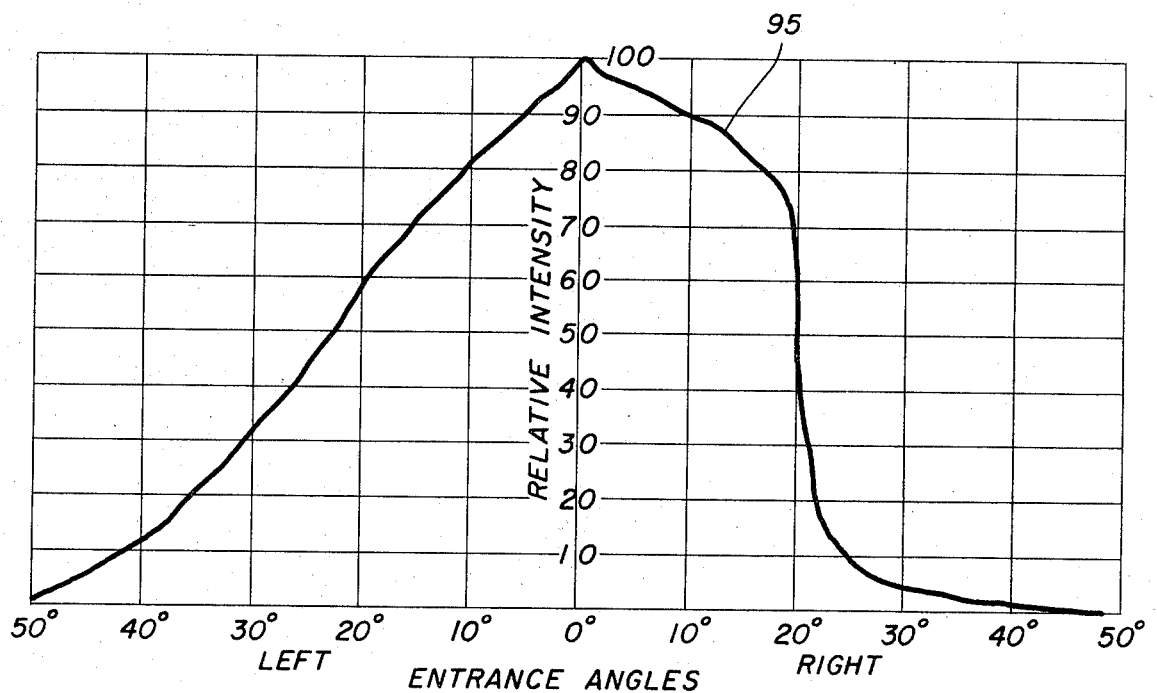
FIG. 7 is a graph illustrating the performance of a single reflector element.

FIG. 7 illustrates the response characteristic of a cube corner reflector element 60. The curve 95 plots the relative intensity of reflected light against entrance angle. An entrance angle of 0° means that the ray of incoming light is parallel to the cube axis 68 of the reflector element. An angle of 10° to the right means that the incoming ray is at an angle of +10° with respect to the cube axis 68, while an angle to the left of 10° means that the incoming ray is at an angle of −10° respect to such cube axis. The measurements are made in a plane containing the cube axis 68 and the edge 65. As can be seen, the curve 95 is not symmetrical, since the response differs, depending upon whether the incoming ray is directed toward the face 61 or the edge 65. Thus, for an incoming ray at an angle of +10°, the specific intensity is 90 percent of what it was for the same ray parallel to the cube axis 68, while at +17°, the intensity is about 80 percent of the maximum. At this point, the intensity drops off very rapidly, until at 25°, the intensity is only about 10 percent. The intensity is about 80 percent when the incoming ray is at −10°, and is down to 60 percent at −20°. The grouping of two reflector elements 60 and 80 into a unit 100, so as to be oriented 180° with respect to each other, causes the response to be symmetrical about 0°, that is, basically the combination of two curves 95, superimposed on each other, one being the mirror image of the other. In that case, the specific intensity at, for example, ±17° would be about 73 percent [½(80+66)] of the specific intensity at 0°. However, even with this "split orientation" construction, the specific intensity at, for example, ±25° is only 25 percent [½ (10 + 40)]. By providing a reflector 50 which has reflector elements at more than one inclination, the over-all zone of reflectorization over which a predetermined level of light is reflected is increased. In the reflector of FIGS. 1 and 2, certain reflector elements have their cube axes at one angle and others have their cube axes at another angle.

Figure 8:
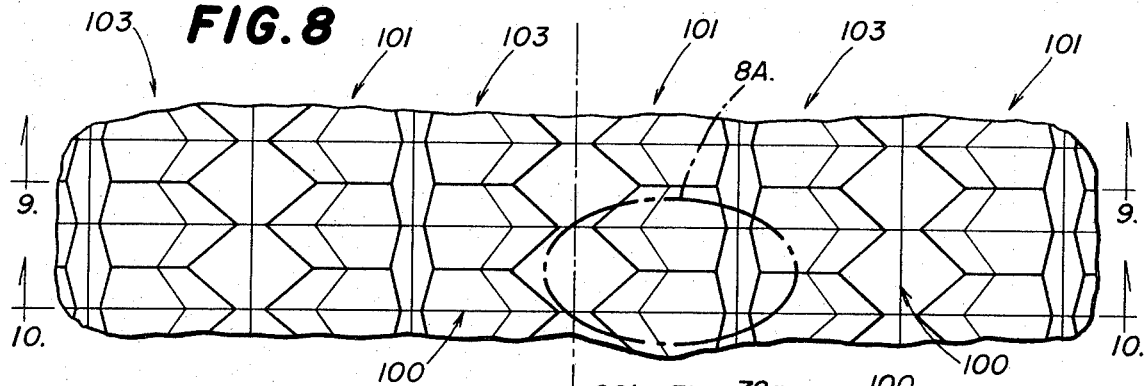
FIG. 8 is a fragmentary view, on an enlarged scale, of the portion of the rear surface of the reflector of FIG. 2 within the ellipse 8.
Figure 8A:
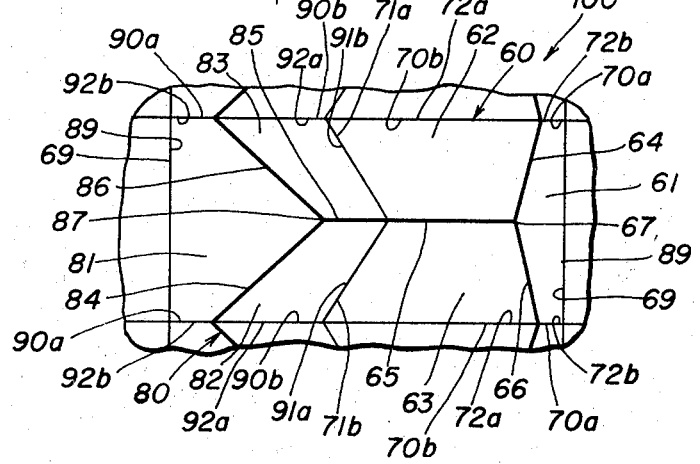
FIG. 8A is a view, on an enlarged scale, of the unit within the circle 8A in FIG. 8.
Figure 9:
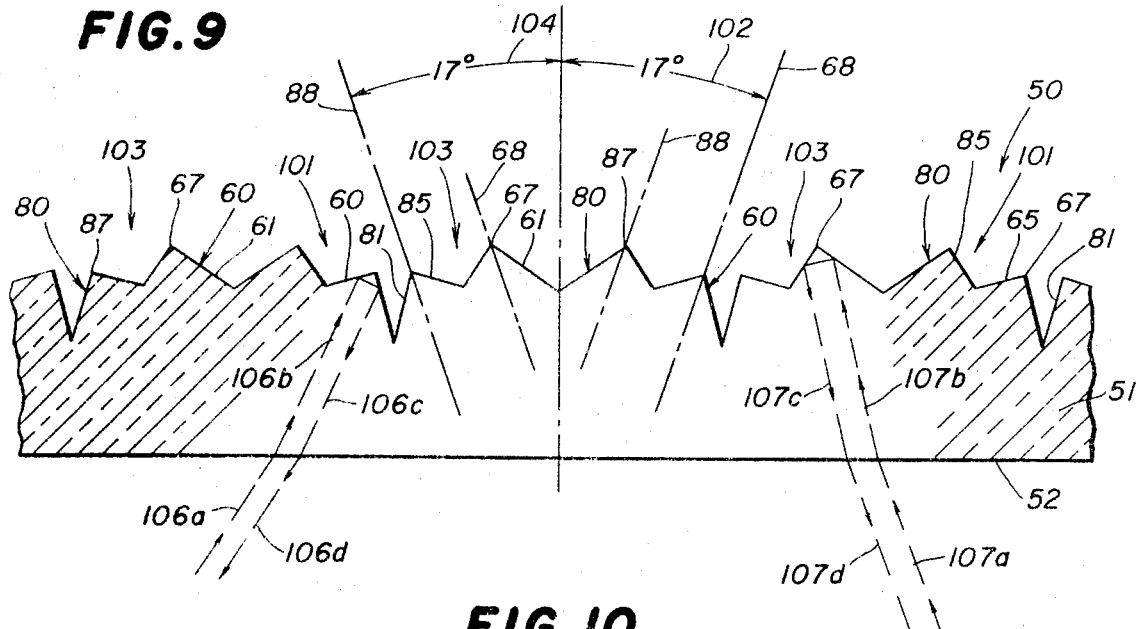
FIG. 9 is a view in section taken along the line 9—9 of FIG. 8.
Figure 10:
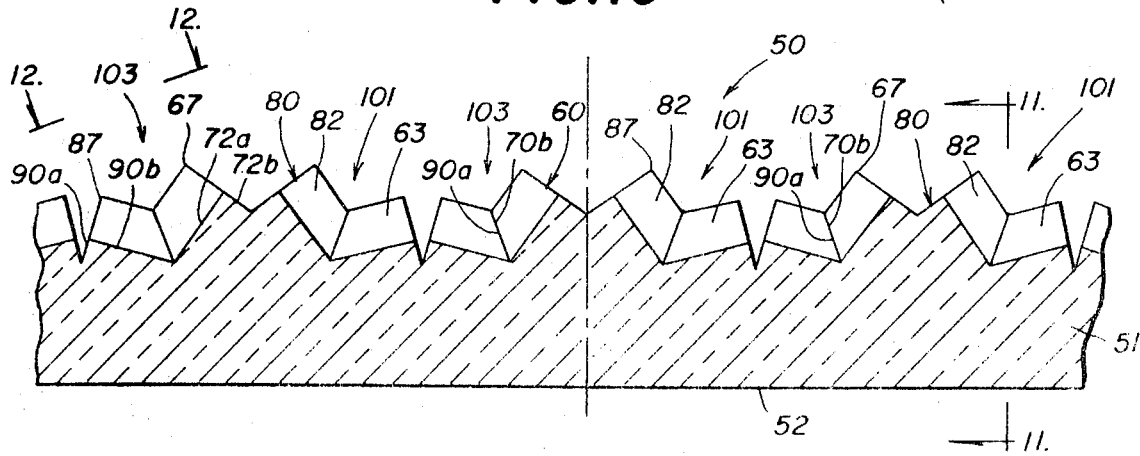
FIG. 10 is a view in section taken along the line 10—10 of FIG. 8.
Figure 11:
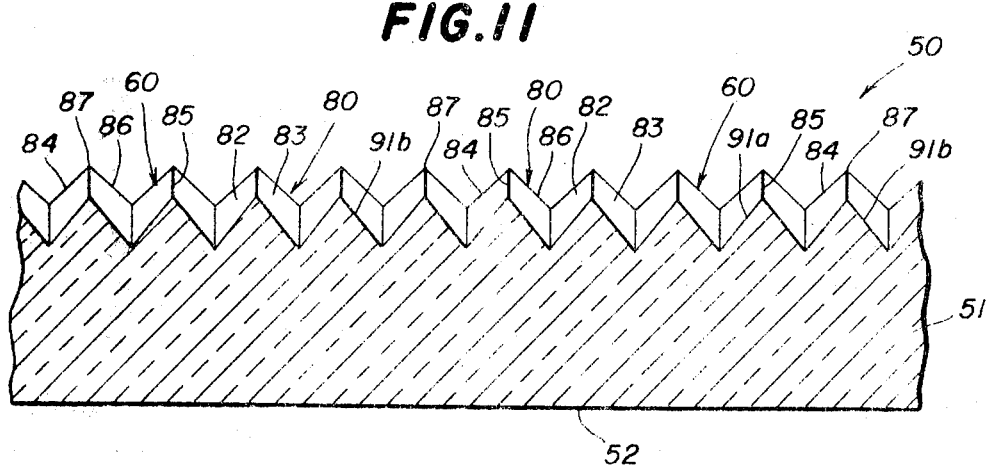
FIG. 11 is a view in section taken along the line 11—11 of FIG. 10.
Figure 16:
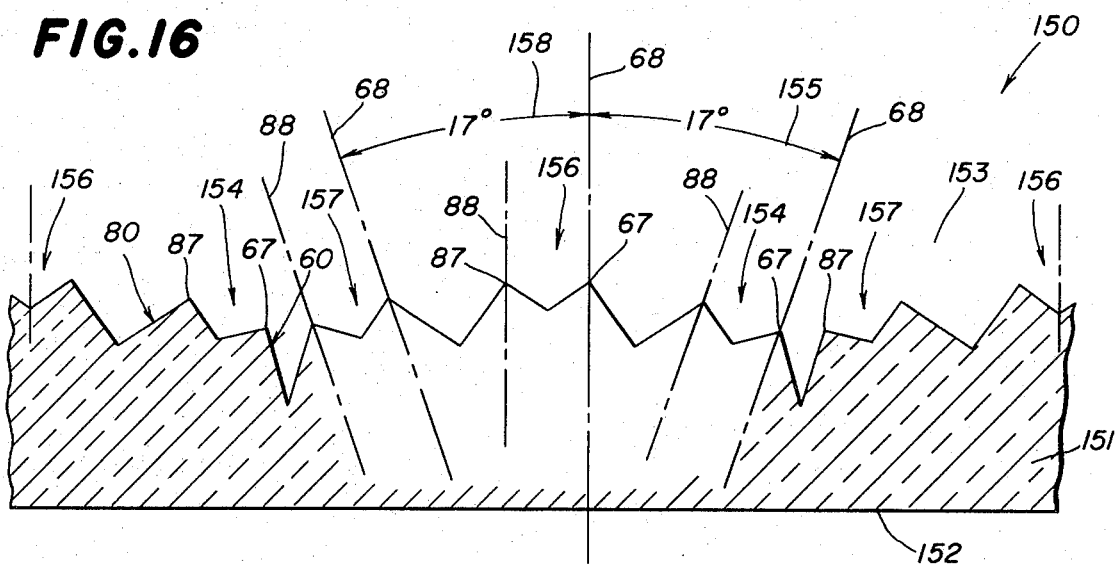
FIG. 16 is a view in section taken along the line 16—16 of FIG. 15.
Figure 17:
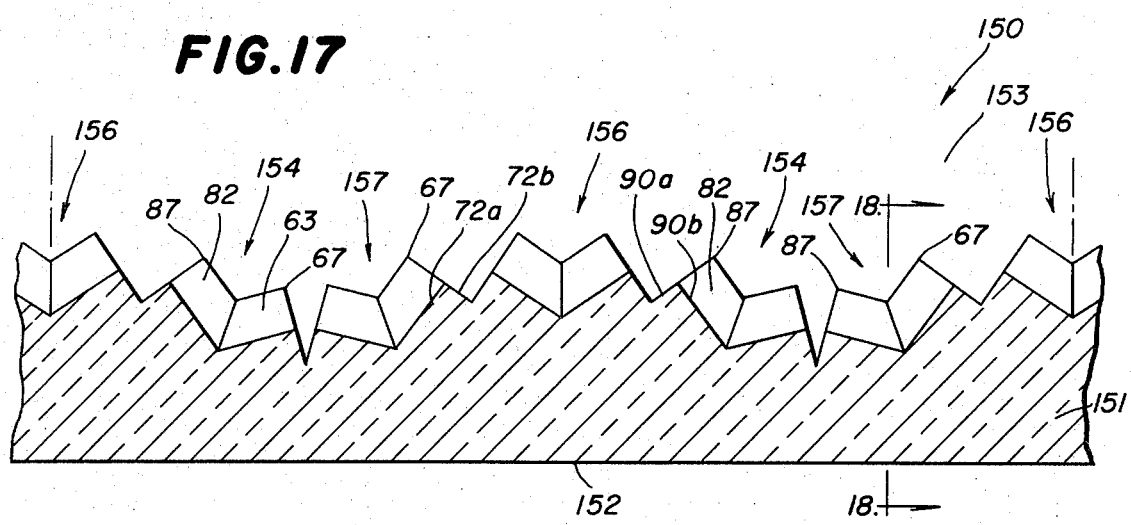
FIG. 17 is a view in section taken along the line 17—17 of FIG. 15.
Figure 18:
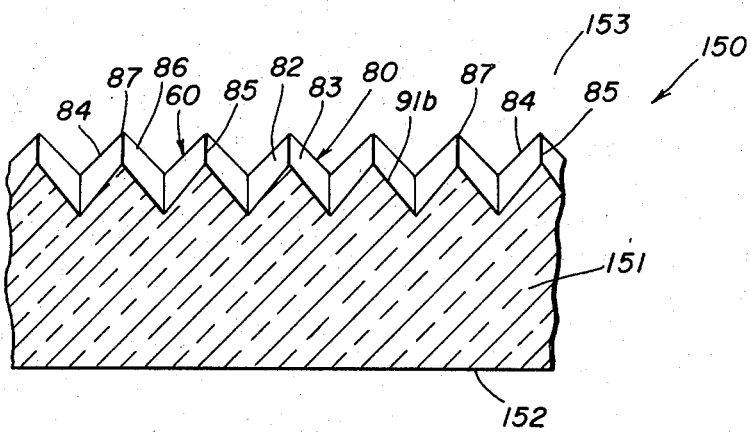
FIG. 18 is a view in section taken along the line 18—18 of FIG. 17.

Turning now to FIGS. 8 to 12, the construction of the reflector 50 will be described. Approximately one half of the units 100 are arranged in rows 101, the reflector elements 60 and 80 in which units have cube axes which are inclined with respect to a normal to the front face 52, at one angle 102 (FIG. 9). The rest of the units 100 are arranged in rows 103, the reflector elements 60 and 80 in which units have cube axes which are inclined at an angle 104. Each of the rows 101 and 103 is bounded by a pair of parallel and rectilinear lines defined by the right angle, rectilinear sides 69 and 89. Thus, the side 69 of each unit 100 is a rectilinear continuation of the corresponding sides 69 of the two longitudinally-adjacent units. Similarly, the side 89 of each unit 100 is a rectilinear continuation of the sides 89 of the two longitudinally-adjacent units 100 in the row in question. Also, the face 61 of each unit 100 is a planar continuation of the faces 61 of the two longitudinally-adjacent units 100. Similarly, the faces 81 of each unit 100 is a planar continuation of the faces 81 of the two adjacent units 100 in the row in question. Also, referring to FIG. 8A, the side portion 92b of one unit 100 is common to the side portion 90a of the longitudinally-adjacent unit 100; the side portion 92a of one unit 100 is in common with the side portion 90b of the adjacent unit; the side portion 70b is in common with the side portion 72a of the adjacent unit; and the side portions 70a and 72b of adjacent units are in common.

The sides 89 of the units in one row 101 or 103 are common to the sides 69 of the units in the laterally-adjacent row. Similarly, the other sides 69 of the units in the row in question are in common with the sides 89 of the units in the laterally-adjacent row. The boundaries of each row 101 and 103 (which boundaries are defined respectively by the sides 69 and 80) are rectilinear and are, therefore, respectively in common with the rectilinear boundaries of the laterally-adjacent rows, despite the cube axes of the elements 60 and 80 in one row 101 being tilted at an angle different than that of the laterally-adjacent row 103. In the embodiment shown in FIGS. 9 to 12, the rows 101 and 103 alternate with each other.

The reflector elements 60 and 80 of the rows 101 are capable of reflecting light back toward the source thereof as long as such source is within a first zone of reflectorization centered about the axes 68 and 88 of the elements 60 and 80 in the rows 101. The reflector elements 60 and 80 in the rows 103 are capable of reflecting light back toward the source thereof as long as such source is within a second zone of reflectorization centered about the axes 68 and 88 of the elements 60 and 80 in the rows 103.

For purposes of illustration, assume the specific intensity of a reflector element 60 or 80 is five units for incoming light parallel to the cube axis thereof, and that the specifications for the reflector 50 require a specific intensity of four units when viewed at a given angle. In such case, and referring to the graph of FIG. 7, (it is to be understood that the curve is accurate for a cube-corner element having its cube axis normal to the front face, but will be somewhat distorted if the axis is angled; thus, the following analysis based on such curve is merely demonstrative) the elements 60 and 80 in the rows 101 will be capable of reflecting the requisite light (four units) toward the source thereof within a zone of reflectorization of ±17° centered about the cube axes 68 and 88 of the elements in the rows 101. Similarly, the elements 60 and 80 in the rows 103 will be capable of reflecting the requisite light (four units) toward the source thereof within a zone of reflectorization of ±17° centered about the cube axes 68 and 88 of the elements in the rows 103. If the angles 102 and 104 of the cube axes 68 and 88 are 17° for example, the zones of reflectorization of the rows 101 and the zones of reflectorization of the rows 103 combine to provide a combined zone of reflectorization of the entire reflector of ±34°. That is, within a combined zone of reflectorization ±34°, the reflector 50 will be capable of reflecting light at the requisite intensity (in this example, four units) back to the source thereof.

An incoming ray 106a from the left, as viewed in FIG. 9, will be refracted by the front face 52 to provide a ray 106b, which ray strikes a reflector element 60. The reflector element 60 retrodirectively returns the light as a ray 106c directed parallel to the ray 106b. The front face 52 again refracts the light to furnish a ray 106d which is parallel to the incoming ray 106a and, therefore, is essentially directed back to the source thereof. An incoming ray 107a from the right is refracted by the front face 52 as a ray 107b, which is then retrodirectively returned by a reflector element 60 as a ray 107c, which latter ray is then refracted again by the front face 52 to provide an outgoing ray 107d directed back toward the source of the ray 107a. As long as the rays 106a and 107a are at angles within the combined zone of reflectorizaton, (that is, ±34° in the example), they will be returned to the source.

An important feature of the present invention is the ability of the reflector 50 to appear uniformly lit when observed at any point within the combined zone of reflectorization. A generally-accepted rule of thumb is that the eye is unable to resolve an angle less than 1 minute, so that at 23 feet, areas spaced apart no more than .08 inches would appear unitary. In one form of the invention, each reflector element 60 or 80 has a side-to-side dimension of .04 inches so that the width of a unit 100 is .08 inches. Thus, the two rows 103, are spaced apart .08 inches; similarly, two rows 101 are spaced apart no more than .08 inches. Thus, the eye would be unable to detect the spacing between the rows 101 or the spacing between the rows 103, as long as the observer was more than about 23 feet from the reflector 50. As long as the observer is more than 23 feet from the reflector, it will appear fully illuminated throughout its area to a viewer who is within the combined zone of reflectorization.

If, instead of the rows 101 and 103 alternating, two rows 101 alternated with two rows 103, the reflector 50 would appear fully illuminated throughout its area as long as the observer were at least 46 feet away.

A particular advantage in the reflector described above is the absence of "slippage" and resultant "shadowing" between adjacent reflector elements 60 and 80. A slippage loss results when there is a discontinuity or axial displacement between adjacent reflector elements, with the result that a portion of one element is blocked by a portion of another element to rays at more than a predetermined inclination to the cube axes. Because the boundaries of each of the rows 101 and 103 are rectilinear, the boundaries of two adjacent rows 101 and 103 define a common line, so that there is no slippage between the reflector elements 60 and 80 in the two rows. The occurrence of shadowing and slippage losses between reflector elements are phenomena well-known to those skilled in the art.

Turning now to FIGS. 13 and 14, an illustrative method of making the reflector shown in FIGS. 1 to 12 will be described. There is shown in FIG. 13 a pin 110 (the pin 110 is shown very much enlarged and may have side-to-side dimension of .04 inches or less) having a square outline, which pin has at one end thereof three mutually-perpendicular faces 111, 112, and 113, adjacent pairs of faces respectively meeting at edges 114, 115, and 116. The faces 111, 112, and 113 are inclined away from a common peak or apex 117. Each of the faces is substantially perpendicular to the other faces, that is, the face 111 is perpendicular to the faces 112 and 113; the face 113 is perpendicular to the faces 111 and 112; etc. The pin 110 has one side 119 of the square boundary which is rectilinear and is contained by the face 111. It should be noted that none of the other three sides of the square outline of the pin 110 is rectilinear. Specifically, the end of the edge 114 divides the left (as viewed in FIG. 13) side into a shorter side portion 120a and a longer side portion 120b. The edge 115 intersects the lower (as viewed in FIG. 13) side at the center thereof to provide equal side portions 121a and 121b. Finally, the edge 116 intersects the right (as viewed in FIG. 3) side to provide a longer side portion 122a and a shorter side portion 122b, the side portion 122b being equal in length to the side portion 120a and the side portion 122a being equal in length to the side portion 120b. The faces 112 and 113 are mirror images of each other, but each has a different shape and area than the face 111. The faces 112 and 113 are symmetrical and symmetrically disposed on opposite sides of their intersection or edge 115, while the face 111 is symmetrical with respect to an extension of the edge 115. Thus, the cube-corner formation at the end of the pin 110 is identical to the reflector element 60 illustrated in FIGS. 3 to 5.

A number of the pins 110 are arranged into a pin bundle 130, FIG. 14 being a transverse cross-section through two adjacent rows of such bundle. If viewed along the cube axes, each row 131 and 132 has an appearance like FIG. 12. A spacer 133 is used to maintain the pins 110 in the desired inclination. The pin bundle 130 is placed in a plating tank in which nickel or the like is deposited or electroformed onto the faces 111, 112, and 113 of the pins 110. After a period of time, a sufficient thickness of material has been electroformed onto the faces to render the electroform self-supporting. At that time, it is pried off the pins 110, and the electroform that is separated therefrom, after being cut and otherwise treated, becomes a mold part. Of course, the steps of electroforming are known in the art, whereby the above description is a sketchy one, simply to describe the over-all process. It is to be understood that there may be a great many steps in the process of forming the pins into the desired array, all the way up to obtaining an electroform 134 for use as a mold. The electroform 134 may be used in an injection molding process to furnish the reflector of FIGS. 1 to 12.

There are, of course, other ways in which the reflector of FIGS. 1 to 12 may be made, the one illustrated schematically in FIG. 14 merely being illustrative. For example, an electroform with nonangled reflex could be produced, that is, the axes of the cube-corner forming cavities would be normal to an imaginary plane defined by the vertexes of said cavities. Strips are then cut from such electroform, such that the sides of the strips are parallel to each other but at a predetermined angle to the back surface thereof. The strips are then assembled such that one side (side X) of one strip abuts against the opposite side (side Y) of a second strip. Side X of the second strip abuts against side Y of a third strip, and so forth, so that the assemblage will have the appearance of the electroform 134. The reflectors can then be molded from this assemblage. The angle of the cube corner axes in the molded reflectors will be equal to the complement of the predetermined angle at which the sides of the strips are cut. If each strip is two reflex elements wide, then the molded reflectors will have the appearance illustrated in FIGS. 8 to 10.

Turning now to FIGS. 15 to 18, the details of a second embodiment of the invention will be described. The reflector 150 shown in these figures comprises a body 151 of transparent material, the body 151 having a smooth front face 152 which is also flat in the embodiment shown. The body 151 is also provided with a configurated rear 153 and a multiplicity of the units 100. Each of the units 100 is identical to the unit depicted in FIG. 6 if viewed along the cube axes. Approximately one-third of the units 100 are arranged in rows 154, the reflector elements 60 and 80 in which units have cube axes that are parallel to each other and inclined at an angle 155 (FIG. 16) with respect to a normal to the front face 152. Another one-third of the units 100 are arranged in rows 156, the reflector elements 60 and 80 in which units have cube axes that are disposed parallel to the normal to the front face 152. The last one-third of the units 100 are arranged in rows 157, the reflector elements 60 and 80 in which units have cube axes that are parallel to each other and inclined at an angle 158.

Each row 154, 156, and 157 is bounded by a pair of parallel and rectilinear lines defined by the sides 69 and 89. Thus, the side 69 of each unit 100 is a rectilinear continuation of the corresponding side 69 of the two longitudinally-adjacent units. Similarly, the side 89 of each unit 100 is a rectilinear continuation of the sides 89 of the two longitudinally-adjacent units 100 in the row in question. Also, the face 61 of each unit 100 is a planar continuation of the faces 61 of the two longitudinally-adjacent units 100. Similarly, the face 81 of each unit 100 is a planar continuation of the faces 81 of the two adjacent units 100 in the row in question. Also, referring to FIG. 15A, the side portion 92b of one unit 100 is in common with the side portion 90a of the longitudinally-adjacent unit 100; the side portion 92a of one unit 100 is in common with the side portion 90b of the adjacent unit; the side portion 70b is in common with the side portion 92a of the adjacent unit; and the side portions 70a and 72b of adjacent units are in common. Each unit 100 in the rows 15, is the mirror image of that shown in FIG. 15A.

The sides 89 of the units in one row 154, 156 or 157 are in common with the sides 69 of the units in the laterally-adjacent row. Similarly, the other sides 69 of the units in the row in question are common with the sides 89 of the units in the laterally-adjacent row. The boundaries of each row 154, 156, and 157 (which boundaries are defined respectively by the sides 69 and 89) are rectilinear and are, therefore, respectively in common with the rectilinear boundaries of the laterally-adjacent rows, despite the cube axes of the elements 60 and 80 in one row being at an angle different than the cube axes of the elements 60 and 80 in the laterally-adjacent rows. The rows 154, 156, and 157 in the embodiment of FIGS. 15 to 18, are arranged in the repeating pattern shown therein.

The reflector elements 60 and 80 in the rows 154 are capable of reflecting light back toward the source thereof as long as such source is within a first zone of reflectorization centered about the cube axes 68 and 88 of the elements 60 and 80 in the rows 154. The reflector elements 60 and 80 in the rows 156 are capable of reflecting light back toward the source thereof as long as such source is within a second zone of reflectorization centered about the cube axes 68 and 88 of the reflector elements 60 and 80 in the rows 156. Finally, the reflector elements 60 and 80 in the rows 157 are capable of reflecting light back toward the source thereof as long as such source is within a third zone of reflectorization centered about the axes 68 and 88 of the elements 60 and 80 in the rows 157.

Making the same assumptions made in respect to the first embodiment, the elements 60 and 80 in the rows 154 will be capable of reflecting light at the requisite intensity (four units) toward the source thereof within a zone of reflectorization of ±17° centered about the cube axes 68 and 88 of such reflector elements. Similarly, the reflector elements 60 and 80 in the rows 157 will be capable of reflecting the requisite light (four units) toward the source thereof within a zone of reflectorization of ±17° centered about the cube axes of the reflector elements in the rows 157. Since the reflector elements 60 and 80 in the rows 156 also operate within a zone of reflectorization of ±17°, but centered about 0°, this latter zone of reflectorization will overlap the other two zones. The three zones of reflectorization respectively of the rows 154, 156, and 157 combine to provide a combined zone of reflectorization of the entire reflector of ±34°, which is the same combined zone furnished by the reflector 50 previously described. It should be appreciated that the cube axes of the reflector elements 60 and 80 in the rows 154 and 157 can, for example, be placed at ±34° respectively. In that case, and making the same assumptions as previously made, the combined zone of reflectorization would be ±51°.

Turning now to FIGS. 19 to 21, the details of a third embodiment of the invention will be described. The reflector 250 shown in these figures comprises a body 251 of transparent material, the body 251 having a smooth front face 252 which is also flat in the embodiment shown. The body 251 is provided with a configurated rear 253 and a multiplicity of the units 100. Each of the units 100 is identical to the unit depicted in FIG. 6 if viewed along the cube axes. Approximately two-thirds of the units 100 are arranged in rows 254, the reflector elements 60 and 80 in which units have the cube axes thereof parallel to each other and inclined, with respect to the normal to the front face 252, at an angle 255 (FIG. 21). Another one-third of the units 100 are arranged in rows 256, the reflector elements 60 and 80 in which units have the cube axes thereof disposed parallel to the normal to the front face 252.

Each of the rows 254 and 256 is bounded by a pair of parallel and rectilinear lines defined by the sides 69 and 89, in much the same manner as that described in respect to the first form. Also, the face 61 of each unit 100 is a planar continuation of the faces 61 of the two longitudinally-adjacent units 100. Similarly, the face 81 of each unit 100 is a planar continuation of the faces 81 of the two adjacent units 100 in the row in question. Also referring to FIG. 20A, the side portion 92b of one unit 100 is common to the side portion 90a of the longitudinally-adjacent unit 100; the side portion 92a of one unit 100 is in common with the side portion 90b of the adjacent unit; the side portion 70b is in common with the side portion 92a of the adjacent unit; and the side portions 70a and 72b of adjacent units are in common. Each unit 100 in the rows 157 is the mirror image of that shown in FIG. 15A.

The sides 89 of the units in one row 254 or 256 are common to the sides 69 of the units in the laterally-adjacent row. Similarly, the other sides 69 of the units in the row in question is in common with the sides 89 of the units in the laterally-adjacent row. The boundaries of each row 254 and 256 (which boundaries are defined respectively by the sides 69 and 89) are rectilinear and are, therefore, respectively in common with the rectilinear boundaries of the laterally-adjacent rows, despite the cube axes of the elements 60 and 80 in one row being at an angle different than the cube axes of the elements 60 and 80 in the laterally-adjacent rows. In the embodiment of FIGS. 19 to 21, two rows 254 are contiguous, and a repeating pattern is defined by two such rows 254 and a single row 256.

The reflector elements 60 and 80 in the rows 254 are capable of reflecting light back toward the source thereof as long as such source is within a first zone of reflectorization centered about the axes 68 and 88 of the elements 60 and 80 in the rows 254. The reflector elements 60 and 80 in the rows 256 are capable of reflecting light back toward the source thereof as long as such source is within a second zone of reflectorization centered about the axes 68 and 88 of the elements 60 and 80 in the rows 156.

Making the same assumptions made in respect to the first embodiment, the elements 60 and 80 are capable of reflecting light at the requisite intensity (four units) toward the source thereof within a zone of reflectorization of ±17° centered about the cube axes 68 and 88 of such elements. If the cube axes of the reflector elements in the rows 254 are at an angle of +30°, the zone of reflectorization of such elements is −13° to −47°. The reflector elements 60 and 80 in the rows 256 are capable of reflecting light at the requisite intensity toward the source thereof within a zone of reflectorization of ±17° centered about 0°. Thus, the combined zone of reflectorization will be −47° to +17°, there being an overlap of the two individual zones between −17° and −13°.

An incoming ray 266a from the left, as viewed in FIG. 21, will be refracted by the front face 252 to provide a ray 266b, which ray strikes a reflector element 60 in a row 254 having its cube axis at an angle 255 of 30° with respect to the normal to the front face 252. The reflector element 60 retrodirectively returns the light as a ray 266c directed parallel to the ray 266b. The front face 252 again refracts the light to furnish a ray 266d which is parallel to the incoming ray 266a and, therefore, is essentially directed back to the source thereof. An incoming ray 267a is refracted by the front face 252 as a ray 267b, which is then retrodirectly returned by a reflector element 60 in a row 256 having its cube axis normal to the front face 252 as a ray 267c, which latter ray is then refracted again by the front face 252 to provide an outgoing ray 267d directed back toward the source of the ray 267a. As long as the rays 266a and 267a are at angles within the combined zone of reflectorization (that is, between −47° and −13° in the example), they will be returned to the source.

Turning now to FIG. 22, there is shown a reflector 350 incorporating therein the features of a fourth embodiment of the present invention. The reflector 350 comprises a body 351 of transparent material having a smooth front face 352 which is preferably flat, and a configurated rear 353. The reflector 350 is so designed that it will be visible to a viewer who is within a combined zone of reflectorization 354, which is 68° in this particular embodiment. The reflector 350 operates in much the same way as the reflector 50. Thus, incoming rays 355a which are within the zone of reflectorization 354 are retrodirectively reflected back to the source of these incoming rays, as outgoing rays 355b.

Reference is now made to FIGS. 23 and 24, which illustrate the details of each of the reflector elements that make up the configurated rear 353 of the reflector 350. The reflector element is designated by the numeral 360 and includes three faces 361, 362, and 363 which intersect along edges 364, 365, and 366. The faces 361, 362, and 363 are inclined away from a common peak or apex 367. Each of the faces is substantially perpendicular to the other faces, that is, the face 361 is perpendicular to the faces 362 and 363, the face 363 is perpendicular to the faces 361 and 362, etc. The optical or cube axis 368 is an imaginary line which passes through the apex 367, and, with respect to which axis, each of the faces 361, 362, and 363 are symmetrically arranged. In other words, the same angle is formed between the cube axis 368 and each of the faces 361, 362, and 363. Similarly, the cube axis 368 is symmetrically arranged with respect to the edges 364, 365, and 366, the angle between each of the edges and the cube axis 368 being the same. The work "cube" has reference only to the fact that the faces are perpendicular to each other, as are the three edges, but does not suggest that the faces are congruent or equal in area.

Each reflector element 360 is rectangular in outline when viewed along the cube axis 368. In the specific form being discussed, the outline is square. The reflector element 360 has two rectilinear sides 369 and 370, which sides and the edge 365 intersect in a common point. A third side of the element 360 is divided into a shorter side portion 371a and a longer side portion 371b, which side portions and the edge 366 intersect in a common point. The remaining side of the reflector element 360 is divided into a shorter side portion 372a and a longer side portion 372b, which side portions and the edge 364 intersect in a common point.

The faces 361 and 362 are symmetrical and symmetrically disposed on opposite sides of the edge 365, while the face 363 is symmetrical about a plane passing through the edge 365 and the opposite corner of the element 360. The faces 361 and 362 are cogruent, but each has a different shape and area than the face 363.

Referring to FIG. 25, there is shown a unit 440 consisting of the element 360 plus three additional reflector elements 380, 400, and 420, all of which are identical to the reflector element 360. The parts of the reflector element 380 are labeled with corresponding numbers, but with 20 added thereto; the parts of the element 400 are identified with corresponding numerals, but with 40 added thereto; and the element 420 is identified with corresponding numerals, but with 60 added thereto. Each of the elements 360, 380, 400, and 420 is rotated or oriented at 90° with respect to the adjacent element. Thus, a plane passing through the edges 385 and 425 is perpendicular to a plane passing through the edges 365 and 405. The faces 363, 383, 403, and 423 meet at a common point which is the center of the unit 440. The side portions 372a and 391a respectively of the elements 360 and 380 are in common; similarly, the side portions 372b and 391b are in common. The side portions 392a and 411a respectively of the elements 380 and 400 are in common, as are the side portions 392b and 411b; similarly, the side portions 412a and 431a respectively of the elements 400 and 420 are in common, as are the side portions 412b and 431b. Finally, the side portions 371a and 432a respectively of the elements 360 and 420 are in common, as are the side portions 371b and 432b. It should also be noted that the unit 440 has a square outline, in which the edges 365, 385, 405, and 425 respectively terminate at corners of the outline.

Turning now to FIGS. 26–30, the construction of the reflector 350 will be described. Approximately one-half of the units 440 are arranged in rows 441, the reflector elements 360, 380, 400 and 420 of which units have cube axes that are inclined at an angle 442 (FIG. 27) with respect to a normal to the front face 352. The rest of the units 440 are arranged in rows 443, the reflector elements in which units have cube axes that are inclined at an angle 444.

The reflector elements of the units 440 in the rows 441 are capable of reflecting light back toward the source thereof as long as such source is within a first zone of reflectorization centered about the cube axes of such reflector elements. The reflector elements of the units 440 in the rows 443 are capable of reflecting light back toward the source thereof as long as such source is within a second zone of reflectorization centered about the cube axes of those reflector elements. The rows 441 and 443 alternate with each other in the embodiment shown.

The angle 442 formed by the cube axes of the reflector elements in the rows 441 may be, for example, 17° to the right; and the angle 444 of the cube axes of the reflector elements in the rows 443 may be 17° to the left. Each of the reflector elements 360, 380, 400, and 420 has basically the same response as that depicted in FIG. 7 for the element 60. Making the same assumptions with respect to the first embodiment, the reflector elements in the rows 441 will be capable of reflecting light at the requisite intensity (four units) toward the source thereof within a zone of reflectorization of $-17°$ centered about the cube axes of the reflector elements in the rows 441. Similarly, the reflector elements in the rows 443 will be capable of reflecting light at the requisite intensity (four units) toward the source thereof within a zone of reflectorization of $\pm 17°$ centered about the cube axes of such reflector elements. The two zones of reflectorization respectively combine to provide a combined zone of reflectorization of the entire reflector of $\pm 34°$.

It should be understood that the reflector elements used in this form do not have right angle, rectilinear sides. Thus, reflector elements in laterally-adjacent rows do not have common sides. However, longitudinally-adjacent reflector elements do have common sides. Thus, the sides 369 and 430 of the reflector elements 360 and 420 respectively in longitudinally-adjacent units 440 are in common. Similarly, the sides 390 and 409 respectively of the reflector elements 380 and 400 in longitudinally-adjacent units 440 are also in common.

By providing the reflector with cube-corner elements at four different orientations, a substantial improvement is achieved in the reflector's response as its orientation is changed, orientation meaning variations in position of the reflector as it is rotated about an axis normal to the front face. The maximum specific intensity at a given orientation and the minimum specific intensity at another orientation are much closer together than if the reflector elements had one, or even two orientations throughout the reflector.

Turning now to FIGS. 31 and 32, an illustrative method of making the reflector shown in FIGS. 22–30 will be described. There is shown in FIG. 31 a pin 450 having a square outline, which pin at one end thereof three mutually-perpendicular faces 451, 452, and 453, adjacent pairs of faces respectively meeting at edges 454, 455, and 456. The faces 451, 452, and 453 are inclined away from a common apex 457. Each of the faces is substantially perpendicular to the other faces, that is, the face 451 is perpendicular to the faces 452 and 453; the face 453 is perpendicular to the faces 451 and 452; etc. The pin 450 has rectilinear sides 459 and 460. The third side is divided into portions 461a and 461b, and the fourth side is divided into portions 462a and 462b. The faces 451 and 452 are congruent, but each has a different shape and area than the face 453. The faces 452 and 453 are symmetrical and symmetrically disposed on opposite sides of their intersection or edge 455, while the face 451 is symmetrical with respect to an extension of the edge 455. Thus, the cube corner formation on the end of the pin 450 is identical to the reflector elements 360, 380, 400 and 420. The reference numerals on the pin 450 correspond to the reference numerals used on the element 360.

A number of the pins 450 are arranged into a pin bundle 470, FIG. 32 being a transverse cross section through two adjacent rows of such bundle. A spacer 473 is used to maintain the pins 470 in the desired inclination. As was described in respect to FIG. 14, the bundle is then placed in an electroforming tank to produce the electroform 474. After separation from the pin bundle 470, the electroform 474 is used in an injection molding process to produce the reflector 550.

Turning now to FIGS. 33–36, a fifth embodiment of the present invention will be described. The reflector 550 shown in these figures comprises a body 551 of transparent material, the body 551 having a smooth front face 552 which is also flat in the embodiment shown. The body 551 is provided with a configurated rear 553 and a multiplicity of the units 440. Each of the units 440 is identical to the unit depicted in FIG. 25 if viewed along the cube axes. Approximately one-third of the units 440 are arranged in rows 554, the reflector elements 360, 380, 400, and 420 in which units have cube axes which are parallel to each other and inclined at an angle 555, with respect to the normal of the front face. Another one-third of the units 440 are arranged in rows 556, the reflector elements 360, 380, 400, and 420 in which units have cube axes that are disposed parallel to the normal to the front face 552. The last one-third of the units 440 are arranged in rows 557, the reflector elements 360, 380, 400, and 420 in which units have cube axes that are parallel to each other and inclined at an angle 558. As was the case in the embodiment of FIGS. 26–30, the sides of longitudinally-adjacent reflector elements are common with each other. Thus, the side 369 of the element 360 and the side 430 of the element 420 are in common; similarly, the sides 390 and 409 respectively of the elements 380 and 400 are in common. Again, the sides of laterally-adjacent elements are not in common, since such sides are not rectilinear.

The reflector elements of the units 440 in the row 554 are capable of reflecting light back toward the source thereof as long as such source is within a first zone of reflectorization centered about the cube axes of such reflector elements. The reflector elements of the units 440 in the rows 556 are capable of reflecting light back toward the source thereof as long as such source is within a second zone of reflectorization centered about the cube axes of the reflector elements. Finally, the reflector elements of the units 440 in the rows 557 are capable of reflecting light back toward the source thereof as long as such source is within a third zone of reflectorization centered about the cube axes of those reflector elements.

The rows 554, 556, and 557 in the embodiment of 33–36 are arranged in the repeating pattern shown therein, that is, no row of a given cube axis inclination is adjacent to a row of the same inclination.

The response characteristic of the reflector elements 360, 380, 400 and 420 is the same as that previously described in respect to FIG. 7. Making the same assumptions made in respect to the first embodiment, the reflector elements in the rows 554 will be capable of reflecting the requisite light toward the source thereof within a zone of reflectorization of ±17° centered about the cube axes of the reflector elements in the row 554. The reflector elements in the rows 556 will be capable of reflecting the requisite light of the four units toward the source thereof within a zone of reflectorization of ±17° centered about the cube axes of the reflector elements in the rows 557. If the angles 555 and 558 are 17°, for example, the zone of reflectorization of the rows 554 will be −34° to 0°, and the zone of reflectorization of the rows 557 will be 0° to +34°. Since the reflector elements in the rows 556 also operate within a zone of ±17°, but centered about 0°, this latter zone of reflectorization will overlap the other two zones. The three zones of reflectorization respectively of the rows 554, 556, and 557 combine to provide a combined zone of reflectorization of the entire reflector of ±34°. It should be appreciated that the cube axes of the reflector elements in the rows 554 and 557 can, for example, be placed at ±34° respectively. In that case, the combined zone of reflectorization will be ±51°.

It is believed that the invention, its mode of construction and assembly, and its many advantages should be readily understood from the foregoing without further description, and it should also be manifest that, while preferred embodiments of the invention have been shown and described for illustrative purposes, the structural details are, nevertheless, capable of wide variation within the purview of the invention as defined in the appended claims.

What is claimed is:

1. A retrodirective reflector for reflecting light substantially back to the source thereof over a wide angle as measured in a predetermined plane, said reflector comprising a body of transparent material having a light-receiving front face, a plurality of retrodirective first reflector elements at the rear of said body, said first reflector elements respectively having substantially parallel first optical axes disposed at a first angle in said predetermined plane, said first reflector elements being capable of reflecting light back toward the source thereof within a first zone of reflectorization defined by said first optical axes, a plurality of retrodirective second reflector elements at the rear of said body, said second reflector elements respectively having substantially parallel second optical axes disposed at a second angle in said predetermined plane, said second reflector elements being capable of reflecting light back toward the source thereof within a second zone of reflectorization defined by said second optical axes, and a plurality of retrodirective third reflector elements at the rear of said body, said third reflector elements respectively having substantially parallel third optical axes disposed at a third angle in said predetermined plane, said third reflector elements being capable of reflecting light back toward the source thereof within a third zone of reflectorization defined by said third optical axes, said first and second and third reflector elements being arranged respectively in first and second and third rows, said rows being interspersed with one another to enable said reflector to appear substantially fully illuminated throughout its area to a viewer who is within a combined zone of reflectorization defined by said first and second and third zones of reflectorization.

2. The retrodirective reflector set forth in claim 1, wherein said first and second and third reflector elements are each of the cube-corner type.

3. The retrodirective reflector set forth in claim 1, wherein each of said rows is no more than two reflector elements wide.

4. The retrodirective reflector set forth in claim 1, wherein said first angle is acute and said second angle is about 90°.

5. The retrodirective reflector set forth in claim 1, wherein said first and third angles are equal but oppositely directed and said second angles are about 90°.

6. A retrodirective reflector for reflecting light substantially back to the source thereof over a wide angle as measured in a predetermined plane, said reflector comprising a body of transparent material having a light-receiving front face, and a plurality of retrodirective cube corner reflector elements at the rear of said body, each of said reflector elements having three mutually perpendicular faces respectively intersecting in three mutually perpendicular edges, each of said reflector elements being rectangular in outline when viewed along the cube axis thereof, each of said reflector elements having a given side which is rectilinear and is contained by one of said faces and lies in a plane perpendicular to the cube axis of such reflector element, said reflector elements being arranged into rectangular units each having two reflector elements, the reflector elements in each unit being contiguous and oriented 180° with respect to each other and having said given sides thereof disposed parallel, said units being arranged in first and second rows each having a pair of parallel and rectilinear boundaries that are defined by said given sides, the cube axes of the reflector elements in said first rows being parallel and disposed at a first angle measured in said predetermined plane, the reflector elements in said first rows being capable of reflecting light back toward the source thereof within a first zone of reflectorization defined by the cube axes of the reflector elements in said first rows, the cube axes of the reflector elements in said second rows being parallel and disposed at a second angle measured in said predetermined plane, the reflector elements in said second rows being capable of reflecting light back toward the source thereof within a second zone of reflectorization defined by the cube axes of the reflector elements in said second rows, said first and second rows being interspersed with each other to enable said reflector to appear substantially fully illuminated throughout its area to a viewer who is within a combined zone of reflectorization defined by said first and second zones of reflectorization.

7. The retrodirective reflector set forth in claim 6, wherein each of said reflector elements is substantially square in outline.

8. The retrodirective reflector set forth in claim 6, wherein two of said faces of each reflector elements are mirror images of each other.

9. The retrodirective reflector set forth in claim 6, wherein the area of said one face of each reflector element is different than the area of either of the other faces thereof.

10. The retrodirective reflector set forth in claim 6, wherein said first and second rows alternate.

11. The retrodirective reflector set forth in claim 6, wherein each of said units has a length substantially twice as great as its width.

12. A retrodirective reflector for reflecting light substantially back to the source thereof over a wide angle as measured in a predetermined plane, said reflector comprising a body of transparent material having a light-receiving front face, and a plurality of retrodirective cube corner reflector elements at the rear of said body, each of said reflector elements having three mutually perpendicular faces respectively intersecting in three mutually perpendicular edges, each of said reflector elements being rectangular in outline when viewed along the cube axis thereof, each of said reflector elements having a given side which is rectilinear and is contained by one of said faces and lies in a plane perpendicular to the cube axis of such reflector element, said reflector elements being arranged into rectangular units each having two reflector elements, the reflector elements in each unit being contiguous and oriented 180° with respect to each other and having said given sides thereof disposed parallel, said units being arranged in first and second and third rows each having a pair of parallel and rectilinear boundaries that are defined by said given sides, the cube axes of the reflector elements in said first row being parallel and disposed at a first angle measured in said predetermined plane, the reflector elements in said first rows being capable of reflecting light back toward the source thereof within a first zone of reflectorization defined by said first cube axes, the cube axes of the reflector elements in said second rows being parallel and disposed at a second angle measured in said predetermined plane, the reflector elements in said second rows being capable of reflecting light back toward the source thereof within a second zone of reflectorization defined by said second cube axes, the cube axes of the reflector elements in said third rows being parallel and disposed at a third angle measured in said predetermined plane, the reflector elements in said third rows being capable of reflecting light back toward the source thereof within a third zone of reflectorization defined by said third cube axes, said first and second and third rows being interspersed with each other to enable said reflector to appear substantially fully illuminated throughout its area to a viewer who is within a combined zone of reflectorization defined by said first and second and third zones of reflectorization.

13. The retrodirective reflector set forth in claim 12, wherein said first and second and third rows follow a repeating pattern.

14. A retrodirective reflector for reflecting light substantially back to the source thereof over a wide angle as measured in a predetermined plane, said reflector comprising a body of transparent material having a light-receiving front face, a plurality of retrodirective cube corner reflector elements at the rear of said body, each of said reflector elements having three mutually perpendicular faces respectively intersecting in three mutually perpendicular edges, each of said reflector elements being rectangular in outline when viewed along the cube axis thereof, each of said reflector elements having one of said edges thereof terminating at a corner of the associated outline, said reflector elements being arranged into rectangular units each having four reflector elements, the reflector elements in each unit being contiguous and oriented 90° with respect to laterally-adjacent reflector elements, said units being arranged in first and second rows, the cube axes of the reflector elements in said first rows being parallel and disposed at a first angle measured in said predetermined plane, the reflector elements in said first rows being capable of reflecting light back toward the source thereof within a first zone of reflectorization defined by said first cube axes, the cube axes of the reflector elements in said second rows being parallel and disposed at a second angle measured in said predetermined plane, the reflector elements in said second rows being capable of reflecting light back toward the source thereof within a second zone of reflectorization defined by said second cube axes, said first and second rows being interspersed with each other to enable said reflector to appear substantially fully illuminated throughout its area to a viewer who is within a combined zone of reflectorization defined by said first and second zones of reflectorization.

15. The retrodirective reflector set forth in claim 14, wherein each of said reflector elements is substantially square.

16. The retrodirective reflector set forth in claim 14, wherein the apexes of said cube-corner reflector elements substantially define a plane.

17. The retrodirective reflector set forth in claim 14, wherein two of said faces of each reflector element are mirror images of each other.

18. The retrodirective reflector set forth in claim 14, wherein the area of the face opposite said one edge is different than the area of either of the other faces thereof.

19. The retrodirective reflector set forth in claim 14, wherein each of said units has a length equal to its width.

20. A retrodirective reflector for reflecting light substantially back to the source thereof over a wide angle as measured in a predetermined plane, said reflector comprising a body of transparent material having a light-receiving front face, a plurality of retrodirective cube corner reflector elements at the rear of said body, each of said reflector elements having three mutually perpendicular faces respectively intersecting in three mutually perpendicular edges, each of said reflector elements being rectangular in outline when viewed along the cube axes thereof, each of said reflector elements having one of said edges thereof terminating at a corner of the associated outline, said reflector elements being arranged into rectangular units each having four reflector elements, the reflector elements in each unit being contiguous and oriented 90° with respect to laterally-adjacent reflector elements, said units being arranged in first and second and third rows, the cube axes of the reflector elements in said first rows being parallel and disposed at a first angle measured in said predetermined plane, the reflector elements in said first rows being capable of reflecting light back toward the source thereof within a first zone of reflectorization defined by said first cube axes, the cube axes of the reflector elements in said second rows being parallel and disposed at a second angle measured in said predetermined plane, the reflector elements in said second rows being capable of reflecting light back toward the source thereof within a second zone of reflectorization defined by said second cube axes of the reflector elements in said third rows being parallel and disposed at a third angle measured in said predetermined plane, the reflector elements in said third rows being capable of reflecting light back toward the source thereof within a third zone of reflectorization defined by said third cube axes, said first and second and third reflector elements being interspersed with each other to enable said reflector to appear substantially fully illuminated throughout its area to a viewer who is within a combined zone of reflectorization defined by said first and second and third zones of reflectorization.

21. The retrodirective reflector set forth in claim 20, wherein said first and second and third rows follow a repeating pattern.

22. A retrodirective reflector for reflecting light substantially back to the source thereof over a wide angle as measured in a predetermined plane, said reflector comprising a body of transparent material having a light-receiving front face, and a plurality of retrodirective cube corner reflector elements at the rear of said body, each of said reflector elements having three mutually perpendicular faces respectively intersecting in three mutually perpendicular edges, each of said reflector elements being rectangular in outline when viewed along the cube axis thereof, each of said reflector elements having a given side which is rectilinear and is contained by one of said faces and lies in a plane perpendicular to the cube axis of such reflector element, said reflector elements being arranged into rectangular units each having first and second reflector elements, said first reflector element in each unit having a given orientation, said second reflector element in each unit being contiguous to the associated first element and oriented 180° with respect thereto, the first and second reflector elements in each unit having said given sides thereof disposed parallel, said units being arranged in first and second rows each having a pair of parallel and rectilinear boundaries that are defined by said given sides, the cube axes of at least said second reflector elements in said first rows being parallel and disposed at a first angle measured in said predetermined plane, said second reflector elements in said first rows being capable of reflecting light back toward the source thereof within a first zone of reflectorization defined by the cube axes of said second reflector elements, the cube axes of at least said first reflector elements in said second rows being parallel and disposed at a second angle measured in said predetermined plane, said first reflector elements in said second rows being capable of reflecting light back toward the source thereof within a second zone of reflectorization defined by the cube axes of said first reflector elements, said first and second rows being interspersed with each other to enable said reflector to appear substantially fully illuminated throughout its area to a viewer who is within a combined zone of reflectorization defined by said first and second zones of reflectorization.

23. The retrodirective reflector set forth in claim 22, wherein the cube axes of said first reflector elements in said first rows are parallel to each other and to the cube axes of said second reflector elements in said first rows, and the cube axes of said second reflector elements in said second rows are parallel to each other and to the cube axes of said first reflector elements in said second rows.

\* \* \* \* \*

UNITED STATES PATENT OFFICE
CERTIFICATE OF CORRECTION

PATENT NO. : 3,873,184
DATED : March 25, 1975
INVENTOR(S) : Sidney A. Heenan

It is certified that error appears in the above-identified patent and that said Letters Patent are hereby corrected as shown below:

Col. 13, line 4, "work" should be -- word --.
Col. 14, line 19, "-17°" should be -- $\pm 17°$ --.
Col. 19, line 59, after "axes" insert -- , the cube axes --.

Signed and sealed this 10th day of June 1975.

(SEAL)
Attest:

RUTH C. MASON
Attesting Officer

C. MARSHALL DANN
Commissioner of Patents
and Trademarks